(12) United States Patent
Uda et al.

(10) Patent No.: US 8,908,822 B2
(45) Date of Patent: Dec. 9, 2014

(54) NUCLEAR REACTOR

(75) Inventors: Nobuki Uda, Hyogo (JP); Shigeyuki Watanabe, Tokyo (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 559 days.

(21) Appl. No.: 12/671,849

(22) PCT Filed: Aug. 27, 2008

(86) PCT No.: PCT/JP2008/065317
§ 371 (c)(1),
(2), (4) Date: Feb. 2, 2010

(87) PCT Pub. No.: WO2009/028562
PCT Pub. Date: Mar. 5, 2009

(65) Prior Publication Data
US 2010/0284507 A1    Nov. 11, 2010

(30) Foreign Application Priority Data

Aug. 31, 2007   (JP) ................... 2007-226393

(51) Int. Cl.
*G21C 15/04*   (2006.01)
*G21C 13/036*   (2006.01)

(52) U.S. Cl.
CPC .............. *G21C 15/04* (2013.01); *G21C 13/036* (2013.01); *Y02E 30/40* (2013.01)
USPC ........................................................ 376/352

(58) Field of Classification Search
USPC ........................................................ 376/352
See application file for complete search history.

(56) References Cited

U.S. PATENT DOCUMENTS 3,623,948 A * 11/1971 Dotson et al. .................. 376/352
3,864,209 A *  2/1975 Tong .............................. 376/352

(Continued)

FOREIGN PATENT DOCUMENTS

EP    1489624 A2    12/2004
EP    1783780 A1     5/2007

(Continued)

OTHER PUBLICATIONS

International Search Report of PCT/JP2008/065317, mailing date of Sep. 22, 2008.

(Continued)

*Primary Examiner* — Jack W Keith
*Assistant Examiner* — Sean P Burke
(74) *Attorney, Agent, or Firm* — Westerman, Hattori, Daniels & Adrian, LLP

(57) ABSTRACT

In a nuclear reactor, a core barrel (46) is disposed in a reactor vessel (41) having an inlet nozzle (44) and an outlet nozzle (45), a core (53) is disposed in the core barrel (46), a lower plenum (58) is partitioned by the reactor vessel (41) and a bottom portion of the core barrel (46), and a downcomer portion (59) is partitioned by the reactor vessel (41) and a side wall of the core barrel (46). The lower plenum (58) includes a straightening member (61) formed of an upper ring (65) and a lower ring (69) in a ring shape, and a plurality of spokes (64 and 68) radially arranged inside the rings (65 and 69), respectively. Heat exchange efficiency is enhanced by uniformly supplying coolant introduced into a pressure vessel to the core from the lower plenum in a radial direction and a circumferential direction.

15 Claims, 14 Drawing Sheets

(56) References Cited

U.S. PATENT DOCUMENTS

| | | | |
|---|---|---|---|
| 4,080,252 A * | 3/1978 | Redding | 376/281 |
| 5,267,285 A * | 11/1993 | Ekeroth et al. | 376/352 |
| 6,567,493 B2 * | 5/2003 | Lazarus | 376/282 |
| 7,245,689 B2 * | 7/2007 | Nakayama et al. | 376/352 |
| 2003/0043955 A1 * | 3/2003 | Lazarus | 376/352 |
| 2007/0133732 A1 * | 6/2007 | Nakayama et al. | 376/352 |

FOREIGN PATENT DOCUMENTS

| | | | |
|---|---|---|---|
| JP | 6-59072 A | 3/1994 | |
| JP | 8-015476 A | 1/1996 | |
| JP | 8-062372 A | 3/1996 | |
| JP | 2005-009999 A | 1/2005 | |
| JP | 2005-069732 A | 3/2005 | |

OTHER PUBLICATIONS

Chinese Office Action dated Feb. 13, 2012, issued in corresponding Chinese Patent Application No. 200880102425.6, (10 pages).

Extended European Search Report mailed May 21, 2012, issued in corresponding European Patent Application 08828367.6.

Notification of Grant of Invention Patent dated Aug. 3, 2012, issued in China Patent Application No. 200880102425.6, with English translation (2 pages).

Notification of Completion of Formalities for Registration dated Aug. 3, 2012, issued in China Patent Application No. 200880102425.6, with English translation (2 pages).

* cited by examiner

NUCLEAR REACTOR

TECHNICAL FIELD

The present invention relates to a nuclear reactor including a core. More specifically, the present invention relates to a cooling structure of a core.

BACKGROUND ART

In pressurized water reactors (PWRs), light water is used as nuclear reactor coolant and neutron moderator, serves as high-temperature and high-pressure water that does not boil in the entire primary system. The high-temperature and high-pressure water is sent to a steam generator by which steam is generated by heat exchange, and the steam is then sent to a turbine generator to produce electricity.

In such pressurized water reactors, the core is cooled by introducing coolant into the nuclear reactor from outside, and circulating the coolant. In other words, the coolant flows in through a plurality of coolant inlet nozzles formed on a reactor vessel, flows down a downcomer portion provided between the reactor vessel and a core barrel, and reaches a lower plenum. The coolant then flows upward by being guided by the inner spherical surface of the lower plenum in the upper direction, passes through a lower core plate and the like, and flows into the core. The coolant flowing into the core absorbs thermal energy generated by fuel assemblies that form the core, thereby cooling the fuel assemblies. The temperature of the coolant becomes high, then the coolant flows upward to an upper plenum, and is discharged through a coolant outlet nozzle formed on the reactor vessel.

In such pressurized water reactors, the lower plenum includes structures such as a radial key that supports the core barrel and an in-core instrumentation guide tube for inserting test equipment into the fuel assemblies. Accordingly, the coolant supplied to the lower plenum through the downcomer portion collides with the structures and is dispersed. Consequently, the flow rate distribution of the coolant in the radial direction and the circumferential direction of the core is not uniform.

Therefore, for example, Patent Document 1 discloses a method of providing a connection plate to straighten the flow of coolant in the lower plenum. In the core structure of a nuclear reactor disclosed in Patent Document 1, the lower plenum includes a connection plate whose outer peripheral shape is asymmetric to the main flowing direction of the coolant. Accordingly, it is possible to prevent the generation and formation of separation vortices. Because the coolant uniformly flows into the core, the pressure drop of the coolant flow can be reduced, thereby stabilizing the coolant flow.

[Patent Document 1] Japanese Patent Application Laid-open No. 2005-009999

DISCLOSURE OF INVENTION

Problem to be Solved by the Invention

The streams of coolant flowing in through the coolant inlet nozzles flow downward while merging in the downcomer portion. When the coolant flow is changed upward in the lower plenum by the inner shape thereof, the connection plate prevents the generation of large vortices. However, vortices are often formed after passing through the connection plate and by the connection plate. Accordingly, it is difficult to produce uniform coolant flow in the radial direction and the circumferential direction of the core.

The present invention has been made to solve the problems above and intended to provide a nuclear reactor that can enhance heat exchange efficiency, by uniformly supplying coolant introduced into the pressure vessel to the core from the lower plenum in the radial direction and the circumferential direction.

Means for Solving Problem

According to an aspect of the present invention, a nuclear reactor includes: a pressure vessel that includes a coolant inlet nozzle and a coolant outlet nozzle at an upper portion thereof; a core barrel being disposed in the pressure vessel; a core being disposed in the core barrel; a lower plenum being partitioned by the pressure vessel and a bottom portion of the core barrel; and a downcomer portion being partitioned by the pressure vessel and a side wall of the core barrel, and being connected to the coolant inlet nozzle and the lower plenum. The lower plenum includes a straightener member including a straightening ring in a ring shape and a plurality of straightening spokes radially arranged inside the straightening ring.

Advantageously, in the nuclear reactor, the straightening ring includes an upper ring and a lower ring, and is supported by a plurality of columns suspended from a lower core plate.

Advantageously, in the nuclear reactor, the straightening ring includes an outer ring and an inner ring, and is supported by a plurality of columns suspended from a lower core plate, and the plurality of straightening spokes is disposed between the outer ring and the inner ring.

Advantageously, in the nuclear reactor, an intermediate ring intersecting with the straightening spokes is provided between the outer ring and the inner ring.

Advantageously, in the nuclear reactor, an outer diameter of the upper ring is set larger than an outer diameter of the lower ring.

Advantageously, in the nuclear reactor, the straightening spokes arranged in the upper ring and the straightening spokes arranged in the lower ring are disposed to be misalign in a circumferential direction.

Advantageously, the nuclear reactor further includes a straightening auxiliary member arranged towards an inner surface of a reactor vessel from an outer peripheral portion of the straightening ring.

Advantageously, in the nuclear reactor, the straightening auxiliary member is in a ring shape and supported by the outer peripheral portion of the straightening ring with a plurality of connection members.

Advantageously, in the nuclear reactor, an upper surface of the straightening ring is placed higher than an upper surface of the straightening auxiliary member.

Advantageously, the nuclear reactor further includes a wall member on an upper surface of the outer peripheral portion of the straightening ring.

Advantageously, in the nuclear reactor further includes a vortex elimination member having a larger outer diameter than that of the straightening ring or a width of the straightening spokes, on the straightening ring or the straightening spokes in a vertical direction.

Advantageously, in the nuclear reactor, the straightening ring or the straightening spokes is (are) supported by a plurality of columns suspended from a lower core plate, and a vortex elimination member in a ring shape is provided on an outer peripheral portion of the columns.

Advantageously, the nuclear reactor further includes a vortex elimination member on a side of each of the straightening spokes in a lengthwise direction of the straightening spokes.

Advantageously, the nuclear reactor further includes an upper core plate in an upper portion of the core barrel in the pressure vessel, and an instrumentation guide tube penetrated through the upper core plate from the upper portion of the pressure vessel.

Effect of the Invention

In a nuclear reactor according to claim 1, a core barrel is disposed in a pressure vessel that includes a coolant inlet nozzle and a coolant outlet nozzle, a core is disposed in the core barrel, a lower plenum is partitioned by the pressure vessel and a bottom portion of the core barrel, and a downcomer portion is partitioned by the pressure vessel and a side wall of the core barrel. The lower plenum includes a straightener member formed of a straightening ring in a ring shape and a plurality of straightening spokes radially arranged inside the straightening ring. When coolant introduced into the pressure vessel flows down the downcomer portion, reaches the lower plenum, reversed in the lower plenum, and flows upward, the flow of coolant is dispersed by the straightening ring and the straightening spokes, thereby preventing the generation of large vortices. Because the flow rate of the coolant supplied to the core is uniformly straightened in the radial direction and the circumferential direction of the core, it is possible to enhance heat exchange efficiency.

In a nuclear reactor according to claim 2, the straightening ring includes an upper ring and a lower ring, and is supported by a plurality of columns suspended from a lower core plate. The coolant that flows down the downcomer portion, reversed in the lower plenum, and flows upward, is dispersed by the columns in addition to the upper ring, the lower ring, and the straightening spokes, thereby preventing the generation of large vortices. Accordingly, the flow rate of the coolant supplied to the core is uniformly straightened in the radial direction and the circumferential direction of the core.

In a nuclear reactor according to claim 3, the straightening ring includes an outer ring and an inner ring, and is supported by a plurality of columns suspended from a lower core plate, and a plurality of straightening spokes is provided between the outer ring and the inner ring. The coolant that flows down the downcomer portion, reversed in the lower plenum, and flows upward, is dispersed by the columns in addition to the outer ring, the inner ring, and the straightening spokes, thereby preventing the generation of large vortices. Accordingly, the flow rate of the coolant supplied to the core is uniformly straightened in the radial direction and the circumferential direction of the core.

In a nuclear reactor according to claim 4, an intermediate ring is arranged between the outer ring and the inner ring, and the intermediate ring intersects with the straightening spokes. The coolant that flows down the downcomer portion, reversed in the lower plenum, and flows upward, is dispersed by the intermediate ring in addition to the outer ring, the inner ring, and the straightening spokes, thereby preventing the generation of large vortices. Accordingly, the flow rate of the coolant supplied to the core is uniformly straightened in the radial direction and the circumferential direction of the core.

In a nuclear reactor according to claim 5, the outer diameter of the upper ring is set larger than the outer diameter of the lower ring. Because the flow area of the coolant flowing in the core is reduced, the coolant that flows down the downcomer portion, reversed in the lower plenum, and flows upward, is dispersed without fail, thereby preventing the generation of large vortices. Accordingly, the flow rate of the coolant supplied to the core is uniformly straightened in the radial direction and the circumferential direction of the core.

In a nuclear reactor according to claim 6, the straightening spokes arranged in the upper ring and the straightening spokes arranged in the lower ring are disposed shifted in a circumferential direction. The coolant that flows down the downcomer portion, reversed in the lower plenum, and flows upward, is dispersed without fail, thereby preventing the generation of large vortices. Accordingly, the flow rate of the coolant supplied to the core is uniformly straightened in the radial direction and the circumferential direction of the core.

In a nuclear reactor according to claim 7, a straightening auxiliary member is arranged towards an inner surface of a reactor vessel from an outer peripheral portion of the straightening ring. The coolant that flows down the downcomer portion and flows into the lower plenum is dispersed by the straightening auxiliary member, thereby preventing the generation of large vortices in the lower plenum.

In a nuclear reactor according to claim 8, the straightening auxiliary member is in a ring shape and supported by the outer peripheral portion of the straightening ring with a plurality of connection members. By properly arranging the straightening auxiliary member between the outer peripheral portion of the straightening ring and the inner surface of the reactor vessel, the coolant that flows down the downcomer portion and flows into the lower plenum is dispersed by the straightening auxiliary member, using a simple structure, thereby preventing the generation of large vortices in the lower plenum.

In a nuclear reactor according to claim 9, an upper surface of the straightening ring is placed higher than an upper surface of the straightening auxiliary member. The coolant that flows down the downcomer portion and flows into the lower plenum is dispersed by the straightening auxiliary member, guided by an outer peripheral surface of the straightening auxiliary member, and straightened as the flow in the circumferential direction, thereby preventing the generation of large vortices in the lower plenum.

In a nuclear reactor according to claim 10, a wall member is arranged on an upper surface of the outer peripheral portion of the straightening ring. The coolant that flows down the downcomer portion and flows into the lower plenum is dispersed by the straightening auxiliary member, guided by the wall member, and straightened as the flow in the circumferential direction, thereby preventing the generation of large vortices in the lower plenum.

In a nuclear reactor according to claim 11, a vortex elimination member having the outer diameter larger than that of the straightening ring or the width of the straightening spokes, is arranged on the straightening ring or the straightening spokes in a vertical direction. The vortices that have not been straightened by the straightening ring or the straightening spokes are straightened by the vortex elimination member. Accordingly, the flow rate of the coolant supplied to the core is uniformly straightened in the radial direction and the circumferential direction of the core.

In a nuclear reactor according to claim 12, the straightening ring or the straightening spokes is (are) supported by a plurality of columns suspended from a lower core plate, and a vortex elimination member in a ring shape is provided on an outer peripheral portion of the columns. Accordingly, the vortices that have not been straightened by the straightening ring or the straightening spokes are straightened by the vortex elimination member. Consequently, the flow rate of the coolant supplied to the core is uniformly straightened in the radial direction and the circumferential direction of the core.

In a nuclear reactor according claim 13, a vortex elimination member is arranged on a side of each of the straightening spokes in a lengthwise direction of the straightening spokes.

The vortices that have not been straightened by the straightening ring or the straightening spokes are straightened by the vortex elimination member. Accordingly, the flow rate of the coolant supplied to the core is uniformly straightened in the radial direction and the circumferential direction of the core.

In a nuclear reactor according to claim 14, an upper core plate is arranged in an upper portion of the core barrel in the pressure vessel, and an instrumentation guide tube is penetrated through the upper core plate from the upper portion of the pressure vessel. Accordingly, the lower plenum does not require columns and the like that support the instrumentation guide tube, and by optimizing the shape of the straightening ring and the straightening spokes, the generation of large vortices is appropriately prevented. Consequently, the flow rate of the coolant supplied to the core is uniformly straightened in the radial direction and the circumferential direction of the core.

Figure 1:
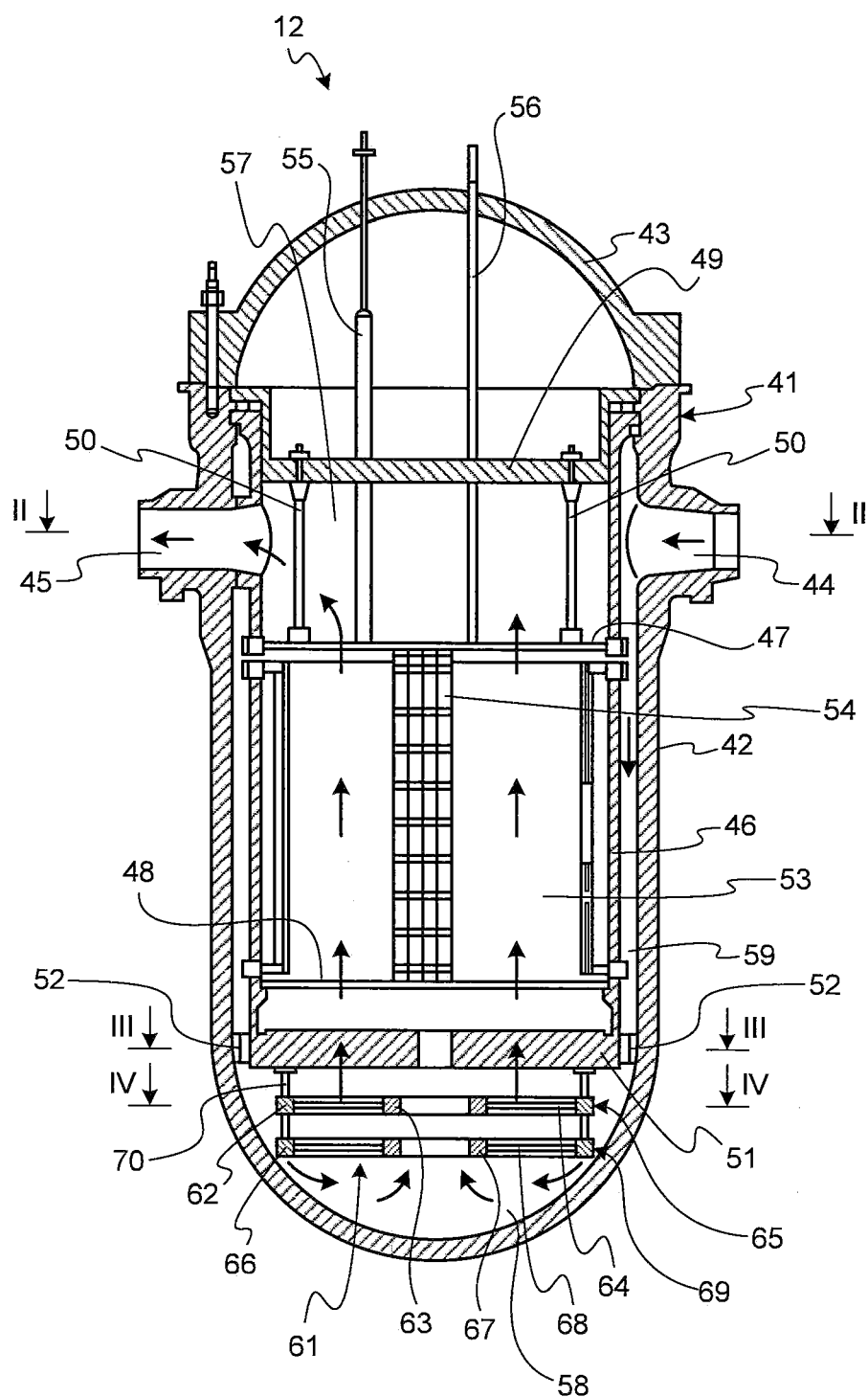
FIG. 1 is a schematic of an internal configuration of a pressurized water reactor according to a first embodiment of the present invention.

EXPLANATIONS OF LETTERS OR NUMERALS 12 pressurized water reactor
41 reactor vessel (pressure vessel)
44 inlet nozzle (coolant inlet nozzle)
45 outlet nozzle (coolant outlet nozzle)
46 core barrel
53 core
56 in-core instrumentation guide tube
57 upper plenum
58 lower plenum
59 downcomer portion
61, 71, 81, 91, 111, 121, 131, 141 straightener member
62, 92, 142 upper outer ring
63, 93 upper inner ring
64, 94, 144 upper spoke (straightening spoke)
65, 95, 145 upper ring (straightening ring)
66, 96 lower outer ring
67, 97 lower inner ring
68, 98 lower spoke (straightening spoke)
69, 99 lower ring (straightening ring)
70, 72, 73, 84, 101, 102, 103, 104, 148, 148 column
82, 83, 100 intermediate ring
112 auxiliary ring (straightening auxiliary member)
115 wall member
122 column (vortex elimination member)
132 vortex elimination ring (vortex elimination member)
146 vortex elimination pipe (vortex elimination member)

BEST MODE(S) FOR CARRYING OUT THE INVENTION

Exemplary embodiments of a nuclear reactor according to the present embodiment will be described in detail with reference to the accompanying drawings. However, the present invention is not limited by the embodiments.

[First Embodiment]

Figure 2:
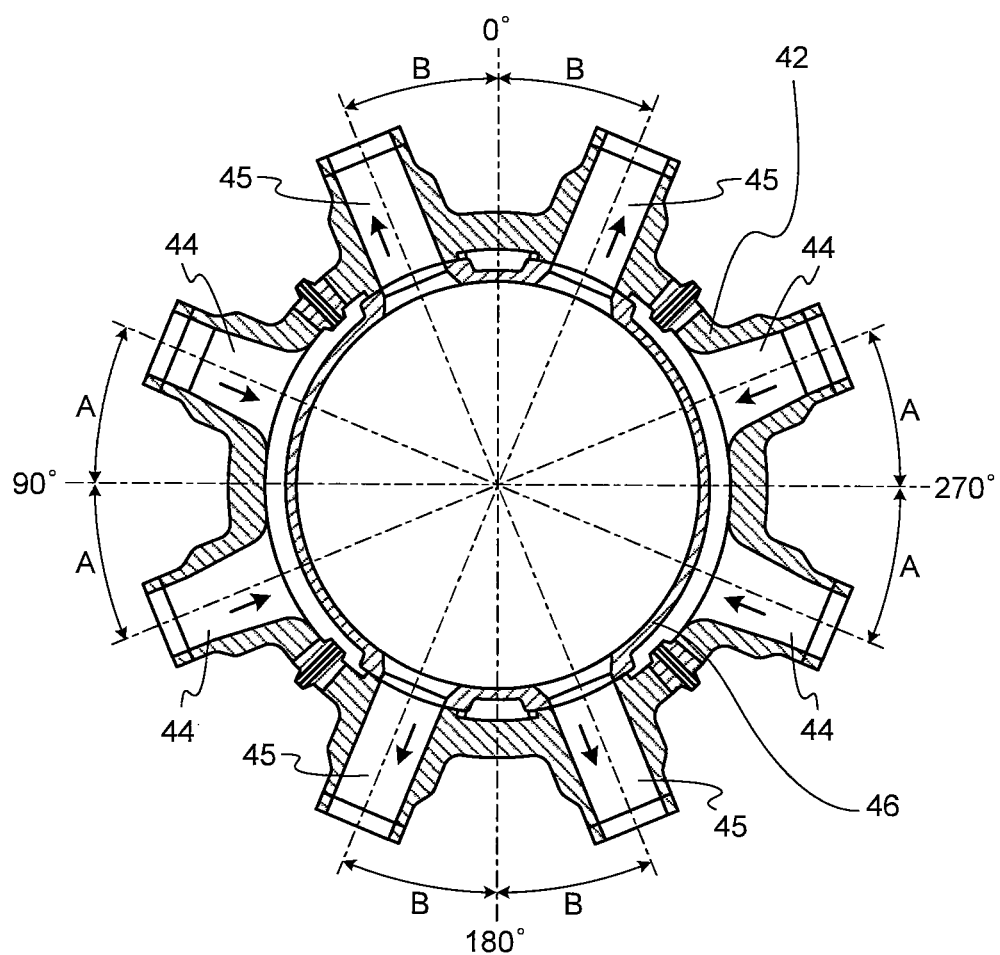
FIG. 2 is a sectional view taken along the line II-II in FIG. 1.
Figure 3:
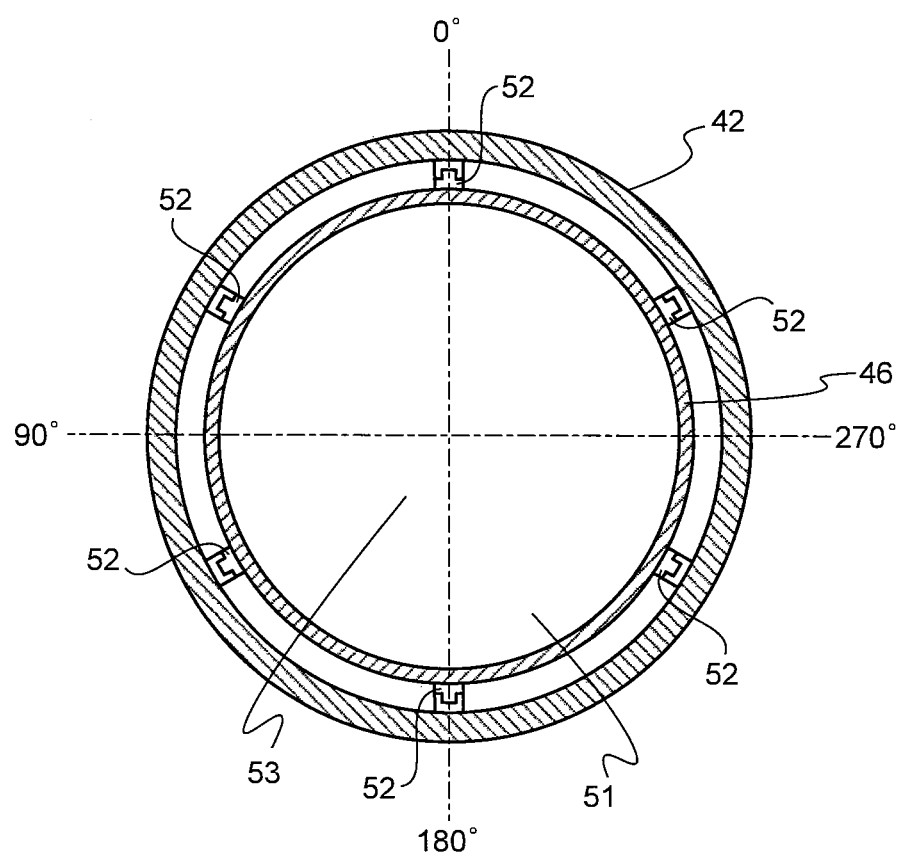
FIG. 3 is a sectional view taken along the line III-III in FIG. 1.
Figure 4:
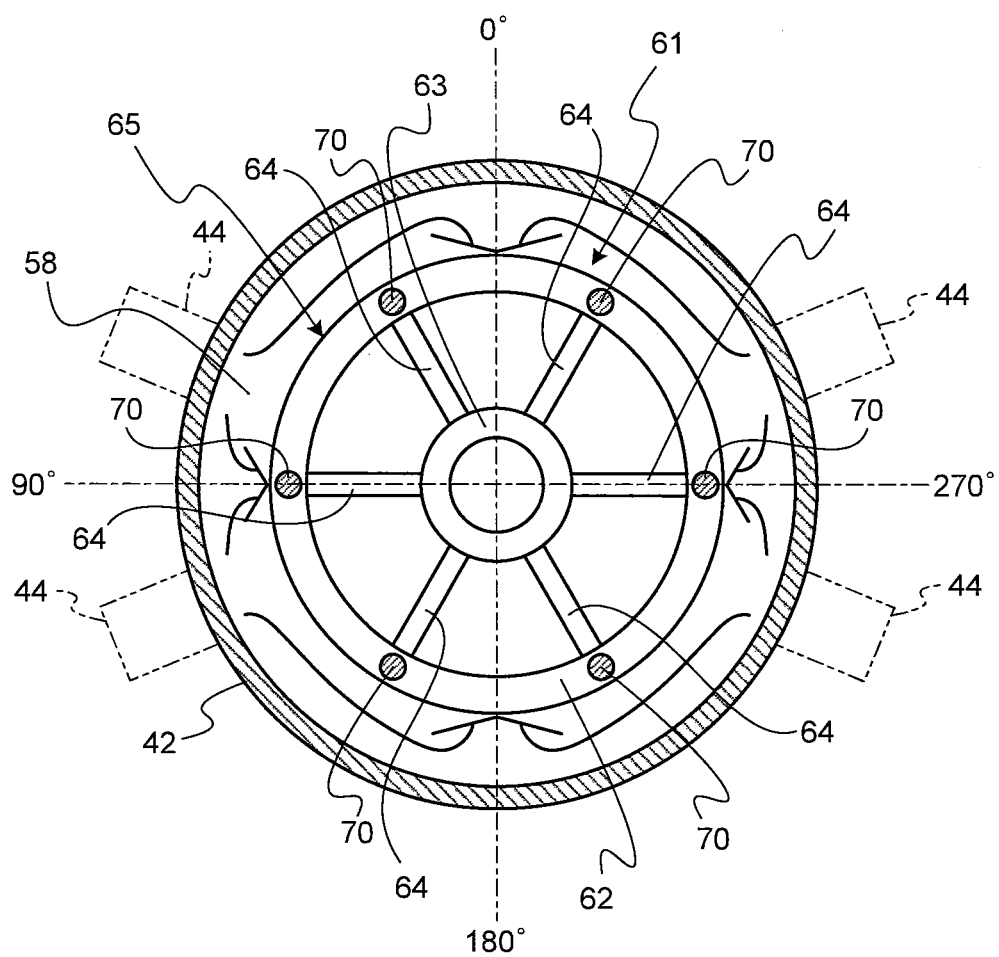
FIG. 4 is a sectional view taken along the line IV-IV in FIG. 1.
Figure 5:
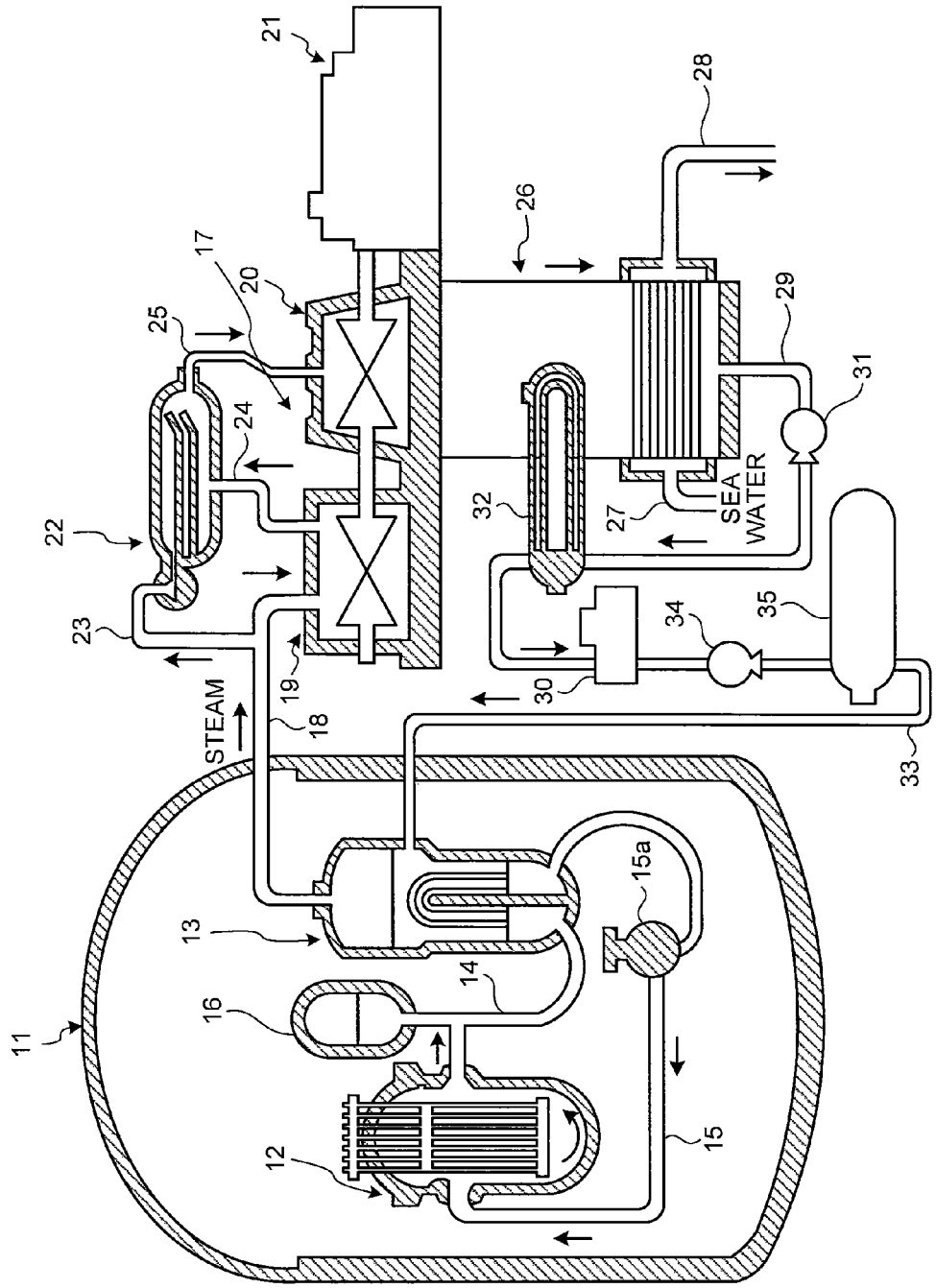
FIG. 5 is a schematic of a nuclear power plant that includes the pressurized water reactor according to the first embodiment.

FIG. 1 is a schematic of an internal configuration of a pressurized water reactor according to a first embodiment of the present invention. FIG. 2 is a sectional view taken along the line II-II in FIG. 1. FIG. 3 is a sectional view taken along the line III-III in FIG. 1. FIG. 4 is a sectional view taken along the line IV-IV in FIG. 1. FIG. 5 is a schematic of a nuclear power plant that includes the pressurized water reactor according to the first embodiment.

A nuclear reactor according to the first embodiment is a pressurized water reactor (PWR) that uses light water as nuclear reactor coolant and neutron moderator, as high-temperature and high-pressure water that does not boil in the entire core. The nuclear reactor sends the high-temperature and high-pressure water to a steam generator by which steam is generated by heat exchange, and sends the steam to a turbine generator to produce electricity.

In a nuclear power plant that includes the pressurized water reactor according to the present embodiment, as shown in FIG. 5, a reactor containment vessel 11 includes a pressurized water reactor 12 and a steam generator 13. The pressurized water reactor 12 and the steam generator 13 are connected by coolant tubes 14 and 15. The coolant tube 14 has a pressurizer 16 and the coolant tube 15 has a coolant pump 15a. In this case, light water is used as moderator and primary coolant, and to prevent the primary coolant from boiling in a core portion, the primary coolant system is controlled so that the high-pressure state from about 150 atmospheres to about 160 atmospheres is maintained by the pressurizer 16. Consequently, in the pressurized water reactor 12, the light water as primary coolant is heated by using fuel such as low-enriched uranium or mixed oxide fuel (MOX), and the high-temperature primary coolant is sent to the steam generator 13 through the coolant tube 14, in a state in which the pressure is maintained at a certain high level by the pressurizer 16. In the steam generator 13, heat is exchanged between the high-pressure and high-temperature primary coolant and secondary coolant, and the cooled primary coolant is returned to the pressurized water reactor 12 through the coolant tube 15.

The steam generator 13 is connected to a steam turbine 17 through a coolant tube 18. The steam turbine 17 includes a high-pressure turbine 19 and a low-pressure turbine 20, and to which a generator 21 is connected. A moisture separation heater 22 is provided between the high-pressure turbine 19 and the low-pressure turbine 20, and a coolant branch tube 23 branched from the coolant tube 18 is connected to the moisture separation heater 22. The high-pressure turbine 19 and the moisture separation heater 22 are connected by a low-temperature reheat tube 24, and the moisture separation heater 22 and the low-pressure turbine 20 are connected by a high-temperature reheat tube 25. The low-pressure turbine 20 of the steam turbine 17 includes a condenser 26, and a water intake tube 27 and a water drain tube 28 that supply and drain coolant (such as sea water) are connected to the condenser 26. A deaerator 30 is connected to the condenser 26 through a coolant tube 29, and the coolant tube 29 has a condenser pump 31 and a low-pressure feed water heater 32. The deaerator 30 is connected to the steam generator 13 through a coolant tube 33, and the coolant tube 33 has a feed water pump 34 and a high-pressure feed water heater 35.

Accordingly, the steam generated by exchanging heat with the high-pressure and high-temperature primary coolant in the steam generator 13 is sent to the steam turbine 17 through the coolant tube 18 (from the high-pressure turbine 19 to the low-pressure turbine 20). The steam is used to drive the steam turbine 17, and the generator 21 generates electricity. At this time, the steam from the steam generator 13 drives the high-pressure turbine 19, and then drives the low-pressure turbine 20, after the moisture included in the steam is removed and being heated by the moisture separation heater 22. The steam that drives the steam turbine 17 is cooled by the condenser 26, and becomes condensate. In the low-pressure feed water heater 32, for example, the condensate is heated by low-pressure steam bled from the low-pressure turbine 20. After impurities such as dissolved oxygen and non-condensable gas (ammonia gas) are removed by the deaerator 30, in the high-pressure feed water heater 35, for example, the condensate is heated by high-pressure steam bled from the high-pressure turbine 19, and is returned to the steam generator 13.

In the pressurized water reactor 12, as shown in FIGS. 1 to 4, a reactor vessel (pressure vessel) 41 includes a reactor vessel main body 42 and a reactor vessel cover 43 mounted on the upper portion of the reactor vessel main body 42, so that core internals can be inserted inside the reactor vessel 41. The reactor vessel cover 43 can be opened and closed relative to the reactor vessel main body 42. The reactor vessel main body 42 has a cylindrical shape, in which an upper portion is opened and a lower portion is closed in a spherical shape, and an inlet nozzle 44 and an outlet nozzle 45 for supplying and draining light water (coolant) as primary coolant are formed on the upper portion.

As shown in detail in FIG. 2, four inlet nozzles 44 are formed on the upper portion of the reactor vessel main body 42. The four inlet nozzles 44 are arranged at a predetermined angle A relative to the 90-270 degree center line, and symmetrically arranged relative to the 0-180 degree center line. Four outlet nozzles 45 are formed thereon, and arranged at a predetermined angle B relative to the 0-180 degree center line, and symmetrically arranged relative to the 90-270 degree center line.

In the reactor vessel main body 42, a core barrel 46 having a cylindrical shape is arranged below the inlet nozzles 44 and the outlet nozzles 45, with a predetermined space from an inner surface of the reactor vessel main body 42. At the upper portion of the core barrel 46, an upper core plate 47 in a disk shape to which a plurality of communication holes, which is not shown, is formed is connected. Similarly, at the lower portion of the core barrel 46, a lower core plate 48 in a disk shape to which a plurality of communication holes, which is not shown, is formed is connected. In the reactor vessel main body 42, an upper core support plate 49 in a disk shape is fixed above the core barrel 46. The upper core plate 47, in other words, the core barrel 46, is supportedly suspended from the upper core support plate 49 by a plurality of core support rods 50. A lower core support plate 51 in a disk shape is also fixed to the lower portion of the core barrel 46. The position of the lower core support plate 51, in other words, the core barrel 46, is determined and maintained by a plurality of radial keys 52 relative to the inner surface of the reactor vessel main body 42. A plurality of communication holes, which is not shown, is also formed on the lower core support plate 51.

As shown in detail in FIG. 3, six radial keys 52 are formed and arranged every 60 degrees relative to the 0 degree center line.

A core 53 is formed by the core barrel 46, the upper core plate 47, and the lower core plate 48. A large number of fuel assemblies 54 is arranged in the core 53. Each of the fuel assemblies 54, although not shown, includes a large number of fuel rods bundled in grid pattern by a support grid, and an upper nozzle is fixed to the upper end, and a lower nozzle is fixed to the lower end. In addition to the fuel rods, the fuel assembly 54 includes a control rod guide tube through which a control rod is inserted, and an in-core instrumentation guide tube through which an in-core instrumentation detector is inserted.

A large number of control rod cluster guide tubes 55 is supported by the upper core support plate 49 by penetrating therethrough. A control rod cluster drive shaft extended from a control rod drive device, which is not shown, mounted on the reactor vessel cover 43 is extended to the fuel assembly 54 through each of the control rod cluster guide tubes 55, and a control rod is fixed to the lower end. A large number of in-core instrumentation guide tubes 56 is supported by the upper core support plate 49 by penetrating therethrough, and the lower end is extended to the fuel assemblies 54.

Accordingly, because the control rod drive device moves the control rod cluster drive shaft and inserts the control rod into the fuel assembly 54, it is possible to control nuclear fission in the core 53. The light water filled inside the reactor vessel 41 is heated by the generated thermal energy, the hot light water is drained through the outlet nozzles 45, and as described above, sent to the steam generator 13. In other words, neutrons are released by nuclear fission of uranium or plutonium used as a fuel of the fuel assemblies 54, and the light water as moderator and primary coolant reduces the kinetic energy of the released fast neutrons, and turns them into thermal neutrons. Accordingly, new fissions are likely to occur, and the light water is cooled by absorbing the generated heat. The number of neutrons generated in the core 53 is adjusted by inserting the control rod into the fuel assembly 54, and the control rod is quickly inserted into the core 53 to stop the nuclear reactor urgently.

In the reactor vessel 41, an upper plenum 57 connected to the outlet nozzle 45 is formed above the core 53, and a lower plenum 58 is formed below the core 53. A downcomer portion 59 that connects the inlet nozzle 44 and the lower plenum 58 is formed between the reactor vessel 41 and the core barrel 46. In other words, the upper plenum 57 is partitioned and formed by the core barrel 46, the upper core support plate 49, and the upper core plate 47. The upper plenum 57 is also connected to the outlet nozzle 45, and connected to the core 53 through a large number of communication holes formed on the upper core plate 47. The lower plenum 58 is partitioned and formed by the lower core support plate 51 that is a bottom portion of the core barrel 46 and the reactor vessel main body 42. The lower plenum 58 is also connected to the core 53 through a large number of communication holes formed on the lower core support plate 51 and the lower core plate 48. The downcomer portion 59 is partitioned and formed by the reactor vessel main body 42 and the side wall of the core barrel 46. The upper portion of the downcomer portion 59 is connected to the inlet nozzle 44 and the lower portion of the downcomer portion 59 is connected to the lower plenum 57.

Accordingly, the light water flows into the reactor vessel main body 42 through the four inlet nozzles 44, flows down the downcomer portion 59, and reaches the lower plenum 58. The light water then flows upward by being guided by the inner spherical surface of the lower plenum 58 in the upper direction, passes through the lower core support plate 51 and the lower core plate 48, and flows into the core 53. The light water flowing into the core 53 cools the fuel assemblies 54, by absorbing thermal energy generated by the fuel assemblies 54 that form the core 53. The temperature of the light water becomes high, then the coolant passes through the upper core plate 47, flows upward to the upper plenum 57, and discharged through the outlet nozzles 45.

In the present embodiment, as shown in detail in FIGS. 1 and 4, the lower plenum 58 includes a straightener member 61 that uniformly disperses and straightens the light water supplied to the lower plenum 58 from the downcomer portion 59, and flows upward to the core 53, in the circumferential direction and the radial direction of the core 53.

The straightener member 61 includes an upper ring (straightening ring) 65 in which an upper outer ring 62 and an upper inner ring 63 in a ring shape are connected by a plurality (six in the present embodiment) of upper spokes (straightening spokes) 64 radially arranged therebetween. The straightener member 61 also includes a lower ring (straightening ring) 69 in which a lower outer ring 66 and a lower inner ring 67 in a ring shape are connected by a plurality (six in the present embodiment) of lower spokes (straightening spokes) 68 radially arranged therebetween. The lower portions of a plurality (six in the present embodiment) of columns 70 suspended from the lower core support plate 51 are connected to the upper outer ring 62 and the lower outer ring 66. Accordingly, the upper ring 65 and the lower ring 69 are arranged in a predetermined position in the lower plenum 58.

In this case, the spokes 64 and 68 are arranged in the circumference direction of the rings 65 and 69, respectively, at regular intervals. One spoke is arranged between the adjacent two inlet nozzles 44, and two spokes are arranged between the separated two inlet nozzles 44. The columns 70 are arranged at the same positions as those of the spokes 64 and 68, in the circumferential direction of the outer rings 62 and 66.

Accordingly, upon reaching the lower plenum 58 by flowing down the downcomer portion 59, the light water flows upward by being guided by the inner spherical surface of the lower plenum 58 in the upper direction, straightened by the straightener member 61, and flows into the core 53. At this time, the light water flowing into the reactor vessel main body 42 through the inlet nozzles 44, collides with the core barrel 46, and is dispersed in the circumferential direction. The light water then merges with the light water flowing in through the adjacent inlet nozzles 44, flows down the downcomer portion 59, and reaches the lower plenum 58. In other words, most of light water that flows down the downcomer portion 59 and flows into the lower plenum 58, flows down along the 0-90-180-270 degree center lines. Consequently, when the light water flows upward by the inner spherical surface of the lower plenum 58, the light water collides with the straightener member 61, in other words, the rings 62, 63, 66, and 67, the spokes 64 and 68, and the columns 70, and is dispersed, thereby preventing the generation of large vortices. Accordingly, the flow rate of the light water supplied to the core 53 from the lower plenum 58 is uniformly straightened in the radial direction and the circumferential direction of the core 53.

Particularly, the light water that flows down along the 90-270 degree center line in the downcomer portion 59, collides with the spokes 64 and 68, and the columns 70 of the straightener member 61, and is dispersed in the circumferential direction. The flow of light water that flows down along the 0-180 degree center line in the downcomer portion 59 is widened in the circumferential direction. Because the light water is likely to collide with the spokes 64 and 68, and the columns 70 of the straightener member 61, and is dispersed in the circumferential direction, the generation of large vortices is appropriately prevented.

In this manner, in the nuclear reactor according to the first embodiment, the core barrel 46 is arranged in the reactor vessel 41 including the inlet nozzles 44 and the outlet nozzles 45, and the core 53 is arranged in the core barrel 46. The lower plenum 58 is partitioned by the reactor vessel 41 and the bottom portion of the core barrel 46, and the downcomer portion 59 is partitioned by the reactor vessel 41 and the side wall of the core barrel 46. The lower plenum 58 includes the straightener member 61 formed of the upper ring 65 and the lower ring 69 in a ring shape and the spokes 64 and 68 radially arranged in the rings 65 and 69, respectively.

Accordingly, when the light water introduced into the reactor vessel 41 through the inlet nozzles 44 flows down the downcomer portion 59, reaches the lower plenum 58, reversed in the lower plenum 58, and flows upward, the light water collides with the rings 62, 63, 66, and 67, the spokes 64 and 68, and the columns 70, and disperses the flow, thereby preventing the generation of large vortices. Consequently, the flow rate of the light water supplied to the core 53 is uniformly straightened in the radial direction and the circumferential direction of the core 53. As a result, it is possible to enhance heat exchange efficiency.

In the nuclear reactor according to the first embodiment, the straightener member 61 includes the upper ring 65 and the lower ring 69, and the rings 65 and 69 include the outer rings 62 and 66, and the inner rings 63 and 67, respectively. The spokes 64 and 68 are arranged between the outer rings 62 and 66, and the inner rings 63 and 67, respectively. The straightener member 61 is supported by the columns 70 suspended from the lower core support plate 51. Accordingly, the light water that flows down the downcomer portion 59, reversed in the lower plenum 58, and flows upward, is dispersed, by the rings 62, 63, 66, and 67, the spokes 64 and 68, and the columns 70. As a result, it is possible to prevent the generation of large vortices without fail.

[Second Embodiment]

Figure 6:
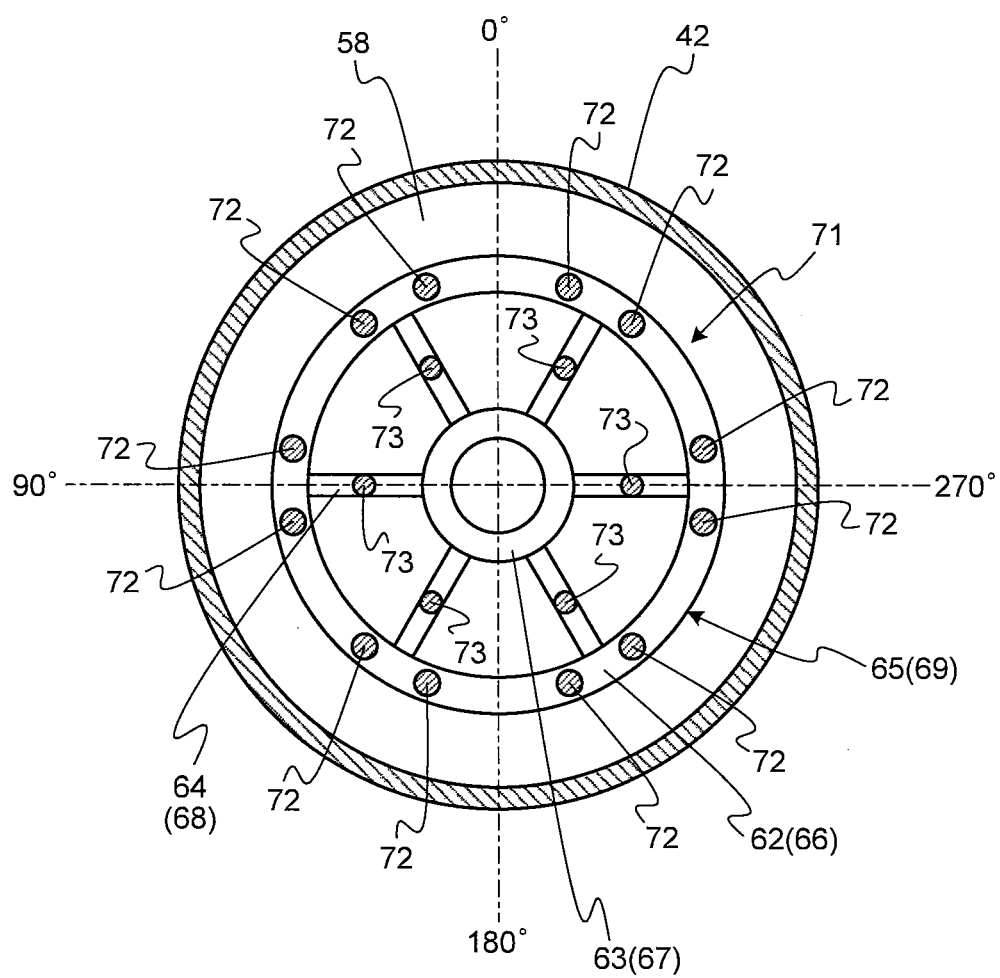
FIG. 6 is a horizontal sectional view of a straightener member provided in a pressurized water reactor according to a second embodiment of the present invention.

FIG. 6 is a horizontal sectional view of a straightener member provided in a pressurized water reactor according to a second embodiment of the present invention. Because the overall configuration of a nuclear reactor according to the present embodiment is similar to that in the first embodiment, it will be described with reference to FIG. 1. The same reference numerals are denoted to portions having the same functions as those of the embodiment, and detailed descriptions thereof will be omitted.

In the nuclear reactor according to the second embodiment, as shown in FIGS. 1 and 6, the lower plenum 58 includes a straightener member 71 that uniformly disperses and straightens the light water supplied to the lower plenum 58 from the downcomer portion 59, and flows upward to the core 53 in the circumferential direction and the radial direction of the core 53.

The straightener member 71 includes the upper ring 65 in which the upper outer ring 62 and the upper inner ring 63 are connected by the six upper spokes 64, and the lower ring 69 in which the lower outer ring 66 and the lower inner ring 67 are connected by the six lower spokes 68. The lower portions of a plurality of columns 72 (12 in the present embodiment) suspended from the lower core support plate 51 are connected to the upper outer ring 62 and the lower outer ring 66, and the lower portions of a plurality of columns 73 (six in the present embodiment) suspended from the lower core support plate 51 are connected to the upper spokes 64 and the lower spokes 68. Accordingly, the upper ring 65 and the lower ring 69 are arranged in a predetermined position in the lower plenum 58.

In this case, the spokes 64 and 68 are arranged in the circumferential direction of the rings 65 and 69, respectively, at regular intervals. One spoke is arranged between the adjacent two inlet nozzles 44, and two spokes are arranged between the separated two inlet nozzles 44. The columns 72 are arranged at both sides of each of the spokes 64 and 68, in the circumferential direction of the outer rings 62 and 66.

Accordingly, upon reaching the lower plenum 58 by flowing down the downcomer portion 59, the light water flows upward by being guided by the inner spherical surface of the lower plenum 58 in the upper direction, straightened by the straightener member 71, and flows into the core 53. At this time, the light water flowing into the reactor vessel main body 42 through the inlet nozzles 44, collides with the core barrel 46, and is dispersed in the circumferential direction. The light water then merges with the light water flowing in through the adjacent inlet nozzles 44, flows down the downcomer portion 59, and reaches the lower plenum 58. In other words, most of light water flowing into the lower plenum 58 through the downcomer portion 59 flows down along the 0-90-180-270 degree center lines. Consequently, when the light water flows upward by the inner spherical surface of the lower plenum 58, the light water collides with the straightener member 71, in other words, the rings 62, 63, 66, and 67, the spokes 64 and 68, and the columns 72 and 73, and is dispersed, thereby preventing the generation of large vortices. As a result, the flow rate of the light water supplied to the core 53 from the lower plenum 58 is uniformly straightened in the radial direction and the circumferential direction of the core 53.

Particularly, the light water that flows down along the 90-270 degree center line in the downcomer portion 59 collides with the spokes 64 and 68, and the columns 72 and 73 of the straightener member 71, and dispersed in the circumferential direction. The flow of light water that flows down along the 0-180 degree center line in the downcomer portion 59 is widened in the circumferential direction. Accordingly, the light water is likely to collide with the spokes 64 and 68, and the columns 72 and 73 of the straightener member 71, and is dispersed in the circumferential direction. Accordingly, it is possible to appropriately prevent the generation of large vortices.

In this manner, in the nuclear reactor according to the second embodiment, the lower plenum 58 in the reactor vessel 41 includes the straightener member 71 formed of the upper ring 65 and the lower ring 69 in a ring shape, and the spokes 64 and 68 radially arranged in the rings 65 and 69, respectively. The lower portions of the columns 72 and 73 suspended from the lower core support plate 51 are connected to the outer rings 62 and 66, and the spokes 64 and 68.

Accordingly, when the light water introduced into the reactor vessel 41 through the inlet nozzles 44 flows down the downcomer portion 59, reaches the lower plenum 58, reversed in the lower plenum 58, and flows upward, the light water collides with the rings 62, 63, 66, and 67, the spokes 64 and 68, and the columns 72 and 73, and disperses the flow, thereby preventing the generation of large vortices. Consequently, the flow rate of the light water supplied to the core 53 is uniformly straightened in the radial direction and the circumferential direction of the core 53. As a result, it is possible to enhance heat exchange efficiency.

[Third Embodiment]

Figure 7:
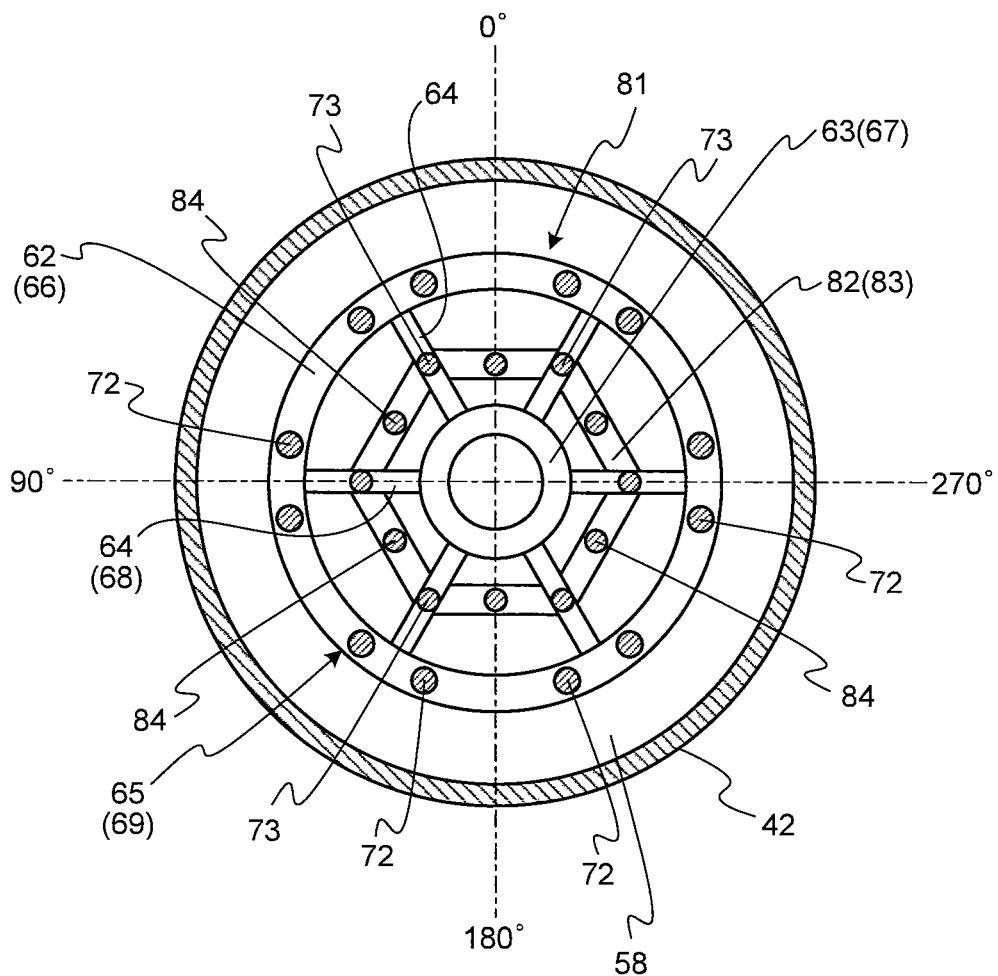
FIG. 7 is a horizontal sectional view of a straightener member provided in a pressurized water reactor according to a third embodiment of the present invention.

FIG. 7 is a horizontal sectional view of a straightener member provided in a pressurized water reactor according to a third embodiment of the present invention. Because the overall configuration of a nuclear reactor according to the present embodiment is similar to that in the first embodiment, it will be described with reference to FIG. 1. The same reference numerals are denoted to portions having the same functions as those of the embodiment, and detailed descriptions thereof will be omitted.

In the nuclear reactor according to the third embodiment, as shown in FIGS. 1 and 7, the lower plenum 58 includes a straightener member 81 that uniformly disperses and straightens the light water supplied to the lower plenum 58 from the downcomer portion 59 and flows upward to the core 53, in the circumferential direction and the radial direction of the core 53.

The straightener member 81 includes the upper ring 65 in which the upper outer ring 62 and the upper inner ring 63 are connected by the six upper spokes 64, and the lower ring 69 in which the lower outer ring 66 and the lower inner ring 67 are connected by the six lower spokes 68. An upper intermediate ring 82 is provided between the upper outer ring 62 and the upper inner ring 63, and a lower intermediate ring 83 is provided between the lower outer ring 66 and the lower inner ring 67. The intermediate rings 82 and 83 are in a hexagonal shape and intersected and connected with the spokes 64 and 68. The lower portions of the 12 pieces of columns 72 suspended from the lower core support plate 51 are connected to the upper outer ring 62 and the lower outer ring 66. The lower portions of the six pieces of columns 73 suspended from the lower core support plate 51 are connected to the upper spokes 64 and the lower spokes 68. The lower portions of six pieces of columns 84 suspended from the lower core support plate 51 are connected to the upper intermediate ring 82 and the lower intermediate ring 83. Accordingly, the upper ring 65 and the lower ring 69 are arranged in a predetermined position in the lower plenum 58.

In this case, the spokes 64 and 68 are arranged in the circumferential direction of the rings 65 and 69, respectively, at regular intervals. One spoke is arranged between the adjacent two inlet nozzles 44, and two spokes are arranged between the separated two inlet nozzles 44. The columns 72 are arranged at both sides of each of the spokes 64 and 68, in the circumferential direction of the outer rings 62 and 66. The columns 84 are arranged between the columns 73 in the circumferential direction of the intermediate rings 82 and 83.

Accordingly, upon reaching the lower plenum 58 by flowing down the downcomer portion 59, the light water flows upward by being guided by the inner spherical surface of the lower plenum 58 in the upper direction, straightened by the straightener member 81, and flows into the core 53. At this time, the light water flowing into the reactor vessel main body 42 through the inlet nozzles 44, collides with the core barrel 46, and is dispersed in the circumferential direction. The light water then merges with the light water flowing in through the adjacent inlet nozzles 44, flows down the downcomer portion 59, and reaches the lower plenum 58. In other words, most of light water flowing into the lower plenum 58 through the downcomer portion 59, flows down along the 0-90-180-270 degree center lines. Consequently, when the light water flows upward by the inner spherical surface of the lower plenum 58, the light water collides with the straightener member 81, in other words, the rings 62, 63, 66, 67, 82, and 83, the spokes 64 and 68, and the columns 72, 73, and 84, and is dispersed, thereby preventing the generation of large vortices. As a result, the flow rate of the light water supplied to the core 53 from the lower plenum 58 is uniformly straightened in the radial direction and the circumferential direction of the core 53.

In this manner, in the nuclear reactor according to the third embodiment, the lower plenum 58 in the reactor vessel 41 includes the straightener member 81 formed of the upper ring 65, the lower ring 69, the intermediate rings 82 and 83 in a ring shape, and the spokes 64 and 68 radially arranged in the rings 65, 69, 82, and 83. The lower portions of the columns 72, 73, and 84 suspended from the lower core support plate 51 are connected to the rings 62, 66, 82, and 83 and the spokes 64 and 68.

Accordingly, when the light water introduced into the reactor vessel 41 through the inlet nozzles 44 flows down the downcomer portion 59, reaches the lower plenum 58, reversed in the lower plenum 58, and flows upward, the light water collides with the rings 62, 63, 66, 67, 82, and 83, the spokes 64 and 68, and the columns 72, 73, and 84, and disperses the flow, thereby preventing the generation of large vortices. Consequently, the flow rate of the light water supplied to the core 53 is uniformly straightened in the radial direction and the circumferential direction of the core 53. As a result, it is possible to enhance heat exchange efficiency.

[Fourth Embodiment]

Figure 8:
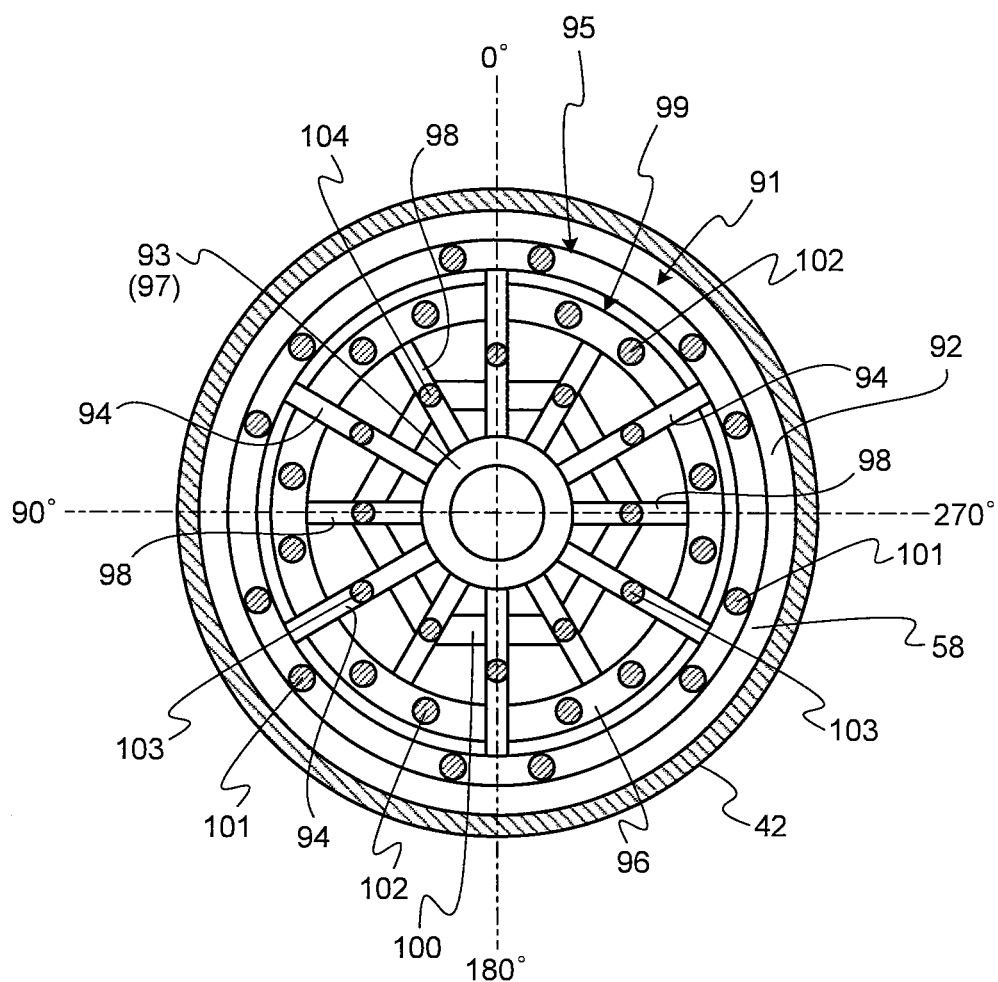
FIG. 8 is a horizontal sectional view of a straightener member provided in a pressurized water reactor according to a fourth embodiment of the present invention.

FIG. 8 is a horizontal sectional view of a straightener member provided in a pressurized water reactor according to a fourth embodiment of the present invention. Because the overall configuration of a nuclear reactor according to the present embodiment is similar to that in the first embodiment, it will be described with reference to FIG. 1. The same reference numerals are denoted to portions having the same functions as those of the embodiment, and detailed descriptions thereof will be omitted.

In the nuclear reactor according to the fourth embodiment, as shown in FIGS. 1 and 8, the lower plenum 58 includes a straightener member 91 that uniformly disperses and straightens the light water supplied to the lower plenum 58 from the downcomer portion 59 and flows upward to the core 53, in the circumferential direction and the radial direction of the core 53.

The straightener member 91 includes an upper ring 95 in which an upper outer ring 92 and an upper inner ring 93 are connected by six upper spokes 94, and a lower ring 99 in which a lower outer ring 96 and a lower inner ring 97 are connected by six lower spokes 98. A lower intermediate ring 100 is provided between the lower outer ring 96 and the lower inner ring 97. The lower intermediate ring 100 is in a hexagonal shape and intersected and connected with the lower spokes 98. The lower portions of 12 pieces of columns 101 suspended from the lower core support plate 51 are connected to the upper outer ring 92, and the lower portions of 12 pieces of columns 102 are connected to the lower outer ring 96. The lower portions of six pieces of columns 103 are connected to the upper spokes 94, and the lower portions of six pieces of columns 104 are connected to the lower spokes 98.

In this case, because the outer diameter of the upper outer ring 92 is set larger than the outer diameter of the lower outer ring 96, the upper outer ring 92 is arranged outside in the radial direction than the lower outer ring 96. The spokes 94 and 98 are arranged in the circumferential direction of the rings 95 and 99 at regular intervals, but are shifted in the circumferential direction.

Accordingly, upon reaching the lower plenum 58 by flowing down the downcomer portion 59, the light water flows upward by being guided by the inner spherical surface of the lower plenum 58 in the upper direction, straightened by the straightener member 91, and flows into the core 53. At this time, the light water that flows upward by the inner spherical surface of the lower plenum 58, collides with the straightener member 81, in other words, the rings 92, 93, 96, 97, 99, and 100, the spokes 94 and 98, and the columns 101, 102, 103, and 104, and is dispersed, thereby preventing the generation of large vortices. As a result, the flow rate of the light water supplied to the core 53 from the lower plenum 58 is uniformly straightened in the radial direction and the circumferential direction of the core 53.

In this manner, in the nuclear reactor according to the fourth embodiment, the lower plenum 58 in the reactor vessel 41 includes the straightener member 91 formed of the upper ring 95, the lower ring 99, and the intermediate ring 100 in a ring shape, and the spokes 94 and 98 radially arranged in the rings 95, 99, and 100. The upper outer ring 92 and the lower outer ring 96 are shifted in the radial direction, and the upper spokes 94 and the lower spokes 98 are shifted in the circumferential direction.

Accordingly, when the light water introduced into the reactor vessel 41 through the inlet nozzles 44, flows down the downcomer portion 59, reaches the lower plenum 58, reversed in the lower plenum 58, and flows upward, the light water collides with the rings 92, 93, 96, 97, 99, and 100, the spokes 94 and 98, and the columns 101, 102, 103, and 104, and disperses the flow, thereby preventing the generation of large vortices. Consequently, the flow rate of the light water supplied to the core 53 is uniformly straightened in the radial direction and the circumferential direction of the core 53. As a result, it is possible to enhance heat exchange efficiency.

[Fifth Embodiment]

Figure 9:
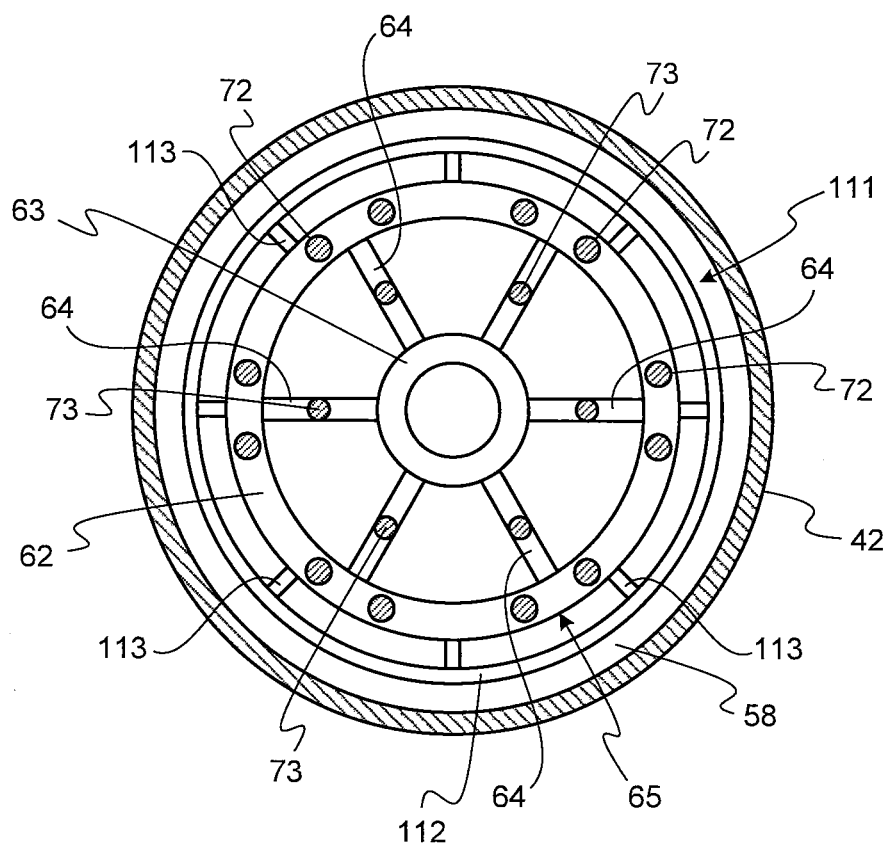
FIG. 9 is a horizontal sectional view of a straightener member provided in a pressurized water reactor according to a fifth embodiment of the present invention.

FIG. 9 is a horizontal sectional view of a straightener member provided in a pressurized water reactor according to a fifth embodiment of the present invention. Because the overall configuration of a nuclear reactor according to the present embodiment is similar to that in the first embodiment, it will be described with reference to FIG. 1. The same reference numerals are denoted to portions having the same functions as those of the embodiment, and detailed descriptions thereof will be omitted.

In the nuclear reactor according to the fifth embodiment, as shown in FIGS. 1 and 9, the lower plenum 58 includes a straightener member 111 that uniformly disperses and straightens the light water supplied into the lower plenum 58 from the downcomer portion 59 and flows upward to the core 53, in the circumferential direction and the radial direction of the core 53.

The straightener member 111 includes the upper ring 65 in which the upper outer ring 62 and the upper inner ring 63 are connected by the six upper spokes 64, and a lower ring similar to that in the first embodiment, which is not shown. The lower portions of 12 pieces of columns 72 suspended from the lower core support plate 51 are connected to the upper outer ring 62 and the lower outer ring, and the lower portions of six pieces of columns 73 are connected to the upper spokes 64 and the lower spokes.

An auxiliary ring (straightening auxiliary member) 112 is provided towards the inner surface of the nuclear reactor main body 42 from the outer peripheral portion of the upper outer ring 62. The auxiliary ring 112 has a ring shape having a diameter larger than that of the upper outer ring 62, and has a cylindrical or a round cross-section, and supported by the outer peripheral surface of the upper outer ring 62 with a plurality (eight in the present embodiment) of connection bars (connection member) 113. In this case, a predetermined space is provided between the auxiliary ring 112 and the outer peripheral surface of the upper outer ring 62. A predetermined space is also provided between the auxiliary ring 112 and the inner surface of the nuclear reactor main body 42.

Accordingly, when the light water flowing into the nuclear reactor main body 42 through the inlet nozzles 44, flows down the downcomer portion 59 and reaches the lower plenum 58, the light water flows upward by being guided by the inner spherical surface of the lower plenum 58 in the upper direction, straightened by the straightener member 111, and flows into the core 53. At this time, the light water that flows down the downcomer portion 59 collides with the auxiliary ring 112, is dispersed, and reaches the lower plenum 58. The light water that flows upward by the inner spherical surface of the lower plenum 58 then collides with the straightener member 111, and is dispersed, thereby preventing the generation of large vortices. As a result, the flow rate of the light water supplied to the core 53 from the lower plenum 58 is uniformly straightened in the radial direction and the circumferential direction of the core 53.

In this manner, in the nuclear reactor according to the fifth embodiment, the lower plenum 58 in the reactor vessel 41 includes the straightener member 111 formed of the upper ring 65 and the lower ring in a ring shape, and in which the auxiliary ring 112 projecting towards the inner surface of the reactor vessel main body 42 from the outer peripheral portion of the upper ring 65 is fixed.

Accordingly, when the light water introduced into the reactor vessel 41 through the inlet nozzles 44 flows down the downcomer portion 59 and reaches the lower plenum 58, the light water collides with the auxiliary ring 112, is dispersed, and reaches the lower plenum 58. When the light water is then reversed in the lower plenum 58 and flows upward, the light water further collides with the upper ring 65 and the lower ring, and disperses the flow, thereby preventing the generation of large vortices. Consequently, the flow rate of the light water supplied to the core 53 is uniformly straightened in the radial direction and the circumferential direction of the core 53. As a result, it is possible to enhance heat exchange efficiency.

The auxiliary ring 112 is in a ring shape and has a cylindrical or a round cross-section. When the light water from the downcomer portion 59 collides with the auxiliary ring 112 and is dispersed, the pressure loss due to the auxiliary ring 112 is reduced, thereby preventing the generation of vortices in the horizontal direction.

[Sixth Embodiment]

Figure 10:
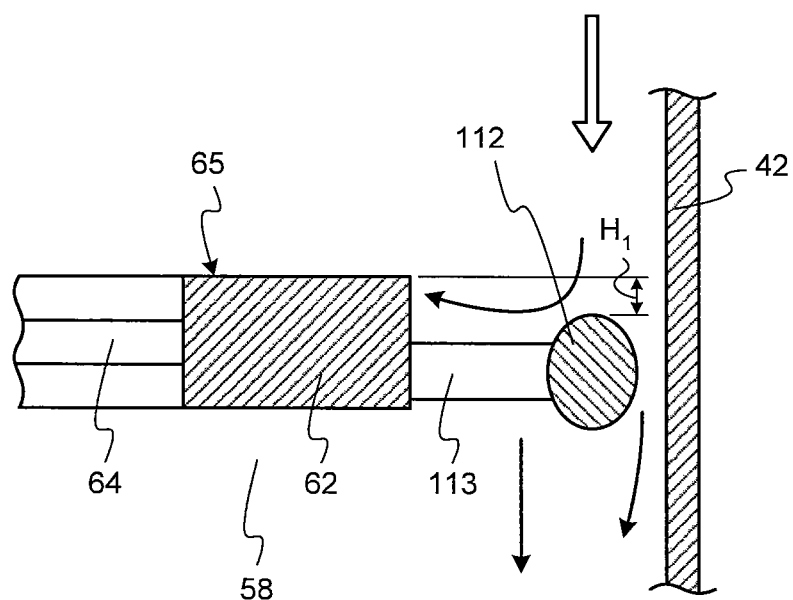
FIG. 10 is a longitudinal sectional view of a straightener member provided in a pressurized water reactor according to a sixth embodiment of the present invention.

FIG. 10 is a longitudinal sectional view of a straightener member provided in a pressurized water reactor according to a sixth embodiment of the present invention. Because the overall configuration of a nuclear reactor according to the present embodiment is similar to that in the fifth embodiment, it will be described with reference to FIGS. 1 and 9. The same reference numerals are denoted to portions having the same functions as those of the embodiment, and detailed descriptions thereof will be omitted.

In the nuclear reactor according to the sixth embodiment, as shown in FIGS. 1, 9, and 10, in the upper ring 65 that forms the straightener member 111, the auxiliary ring 112 is fixed to the outer peripheral surface of the upper outer ring 62, by the connection bars 113. In this case, the upper surface of the upper outer ring 62 is placed higher than the upper surface of the auxiliary ring 112. In other words, a level difference $H_1$ is created between the upper surface of the upper outer ring 62 and the upper surface of the auxiliary ring 112.

Accordingly, when the light water flowing into the reactor vessel main body 42 through the inlet nozzles 44 flows down the downcomer portion 59 and reaches the lower plenum 58, the light water flows upward by being guided by the inner spherical surface of the lower plenum 58 in the upper direction, straightened by the straightener member 71, and flows into the core 53. The light water that flows down the downcomer portion 59 collides with the auxiliary ring 112, is dispersed, and reaches the lower plenum 58, through a space between the upper outer ring 62 and the auxiliary ring 112, and a space between the auxiliary ring 112 and the reactor vessel main body 42. A part of the light water collided with the auxiliary ring 112 and is dispersed, flows the center of the reactor vessel main body 42. But because the level difference $H_1$ is created between the upper surface of the upper outer ring 62 and the upper surface of the auxiliary ring 112, a part of the light water collides with the outer peripheral surface of the upper outer ring 62, and reaches the lower plenum 58 by flowing downward in the circumferential direction. The light water flowing into the lower plenum 58 flows upward by the inner spherical surface, further collides with the straightener member 111, and is dispersed, thereby preventing the generation of large vortices. Accordingly, the flow rate of the light water supplied to the core 53 from the lower plenum 58 is uniformly straightened in the radial direction and the circumferential direction of the core 53.

In this manner, in the nuclear reactor according to the sixth embodiment, the lower plenum 58 in the reactor vessel 41 includes the straightener member 111 formed of the upper ring 65 and the lower ring in a ring shape and in which the auxiliary ring 112 projecting towards the inner surface of the reactor vessel main body 42 from the outer peripheral portion of the upper ring 65 is fixed, and the upper surface of the upper outer ring 62 is placed higher than the upper surface of the auxiliary ring 112.

Accordingly, when the light water introduced into the reactor vessel 41 through the inlet nozzles 44 flows down into the lower plenum 58 through the downcomer portion 59, the light water collides with the auxiliary ring 112, is dispersed, and reaches the lower plenum 58. The light water also collides with the outer peripheral surface of the upper outer ring 62, reaches the lower plenum 58 by flowing downward in the circumferential direction, reversed in the lower plenum 58, and flows upward. The light water further collides with the upper ring 65 and the lower ring, and disperses the flow, thereby preventing the generation of large vortices. Consequently, the flow rate of the light water supplied to the core 53 is uniformly straightened in the radial direction and the circumferential direction of the core 53. As a result, it is possible to enhance heat exchange efficiency.

[Seventh Embodiment]

Figure 11:
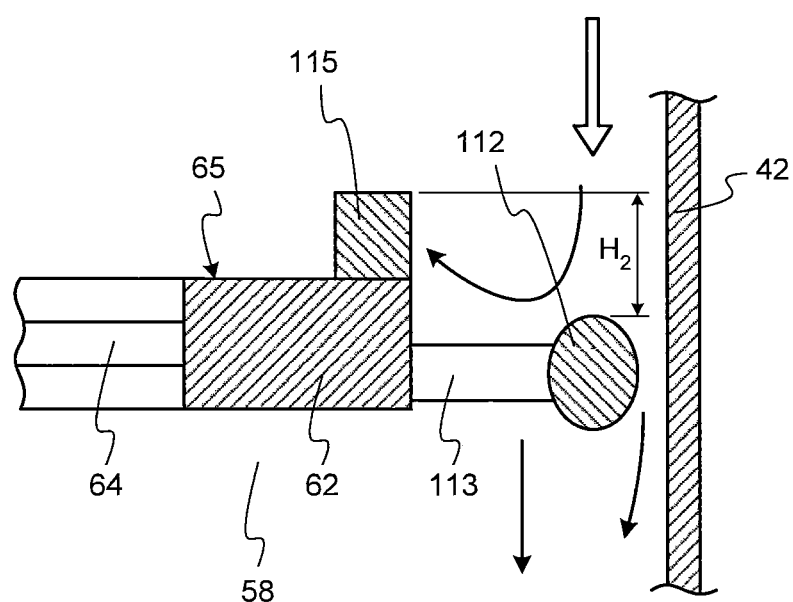
FIG. 11 is a longitudinal sectional view of a straightener member provided in a pressurized water reactor according to a seventh embodiment of the present invention.

FIG. 11 is a longitudinal sectional view of a straightener member provided in a pressurized water reactor according to a seventh embodiment of the present invention. Because the overall configuration of a nuclear reactor according to the present embodiment is similar to that in the fifth embodiment, it will be described with reference to FIGS. 1 and 9. The same reference numerals are denoted to portions having the same functions as those of the embodiment, and detailed descriptions thereof will be omitted.

In the nuclear reactor according to the seventh embodiment, as shown in FIGS. 1, 9, and 11, in the upper ring 65 that forms the straightener member 111, the auxiliary ring 112 is fixed to the outer peripheral surface of the upper outer ring 62, by the connection bars 113. A wall member 115 is provided on the upper surface of the outer peripheral portion of the upper outer ring 62. The wall member 115 is in a ring shape along the outer periphery of the upper outer ring 62, has a rectangular cross-section, and fixed to the upper surface of the upper outer ring 62. In this case, the upper surface of the wall member 115 is placed higher than the upper surface of the auxiliary ring 112. In other words, a level difference H$_2$ is created between the upper surface of the wall member 115 and the upper surface of the auxiliary ring 112.

Accordingly, when the light water flowing into the reactor vessel main body 42 through the inlet nozzles 44 flows down the downcomer portion 59 and reaches the lower plenum 58, the light water flows upward by being guided by the inner spherical surface of the lower plenum 58 in the upper direction, straightened by the straightener member 111, and flows into the core 53. At this time, the light water that flows down the downcomer portion 59, collides with the auxiliary ring 112, and is dispersed. The light water then reaches the lower plenum 58, through a space between the upper outer ring 62 and the auxiliary ring 112, and a space between the auxiliary ring 112 and the reactor vessel main body 42. A part of the light water collided with the auxiliary ring 112 and is dispersed flows the center of the reactor vessel main body 42, but also collides with the outer peripheral surface of the wall member 115, and reaches the lower plenum 58 by flowing downward in the circumferential direction. The light water flowing into the lower plenum 58 flows upward by the inner spherical surface, further collides with the straightener member 111, and is dispersed, thereby preventing the generation of large vortices. Consequently, the flow rate of the light water supplied to the core 53 from the lower plenum 58 is uniformly straightened in the radial direction and the circumferential direction of the core 53.

In this manner, in the nuclear reactor according to the seventh embodiment, the lower plenum 58 in the reactor vessel 41 includes the straightener member 111 formed of the upper ring 65 and the lower ring in a ring shape and in which the auxiliary ring 112 projecting towards the inner surface of the reactor vessel main body 42 from the outer peripheral portion of the upper ring 65 is fixed, and the wall member 115 in a ring shape mounted on the upper surface of the upper outer ring 62.

Accordingly, when the light water introduced into the reactor vessel 41 through the inlet nozzles 44 flows down into the lower plenum 58 through the downcomer portion 59, the light water collides with the auxiliary ring 112, is dispersed, and reaches the lower plenum 58. The light water also collides with the outer peripheral surface of the wall member 115 and reaches the lower plenum 58 by flowing downward in the circumferential direction. When the light water is reversed in the lower plenum 58 and flows upward, the light water further collides with the upper ring 65 and the lower ring, and disperses the flow, thereby preventing the generation of large vortices. Consequently, the flow rate of the light water supplied to the core 53 is uniformly straightened in the radial direction and the circumferential direction of the core 53. As a result, it is possible to enhance heat exchange efficiency.

In the fifth, the sixth, and the seventh embodiments described above, the auxiliary ring 112 is provided over the entire circumference of the upper outer ring 62 in a ring shape. However, the auxiliary ring 112 may be partially provided in a curve shape or in a straight line shape. The auxiliary ring 112 has a cylindrical or a round cross-section. However, any shape that can reduce the resistance of the light water flowing downward such as an oval shape or a triangular shape may be used. In the seventh embodiment described above, the wall member 115 is arranged over the entire circumference of the upper surface of the upper outer ring 62 in a ring shape. However, the wall member 115 may be partially provided in a curve shape.

[Eighth Embodiment]

Figure 12:
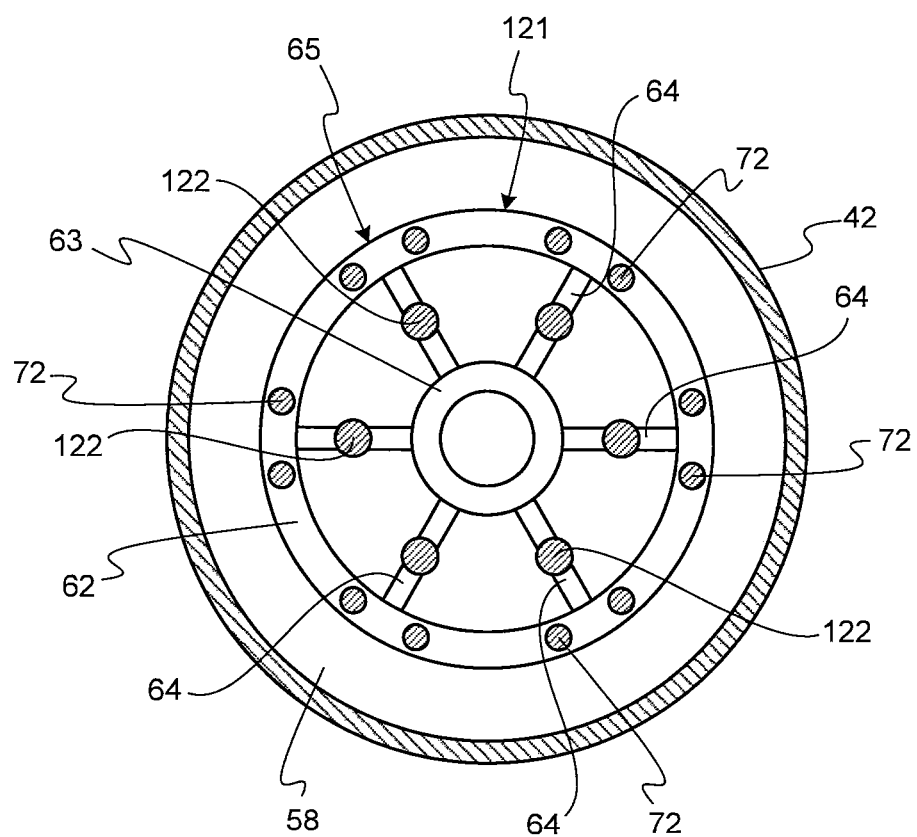
FIG. 12 is a horizontal sectional view of a straightener member provided in a pressurized water reactor according to an eighth embodiment of the present invention.

FIG. 12 is a horizontal sectional view of a straightener member provided in a pressurized water reactor according to an eighth embodiment of the present invention. Because the overall configuration of a nuclear reactor according to the present embodiment is similar to that in the first embodiment, it will be described with reference to FIG. 1. The same reference numerals are denoted to portions having the same functions as those of the embodiment, and detailed descriptions thereof will be omitted.

In the nuclear reactor according to the eighth embodiment, as shown in FIGS. 1 and 12, the lower plenum 58 includes a straightener member 121 that uniformly disperses and straightens the light water supplied to the lower plenum 58 from the downcomer portion 59, and flows upward to the core 53, in the circumferential direction and the radial direction of the core 53.

The straightener member 121 includes the upper ring 65 in which the upper outer ring 62 and the upper inner ring 63 are connected by the six upper spokes 64, and the lower ring similar to that of the first embodiment, which is not shown. The lower portions of the 12 pieces of columns 72 suspended from the lower core support plate 51 are connected to the upper outer ring 62 and the lower outer ring, and the lower portions of the six pieces of columns 122 are connected to the upper spokes 64 and the lower spokes. In this case, the six pieces of columns 122 connected to the upper spokes 64 and the lower spokes are formed so as to function as a vortex elimination member having a larger outer diameter than the widths of the upper spokes 64 and the lower spokes. In other words, the upper ends of the columns 122 are fixed to the lower core support plate 51, and the lower ends of the columns 122 penetrate through the upper spokes 64 and the lower spokes, and extended around the bottom surface of the reactor vessel main body 42.

Accordingly, upon reaching the lower plenum 58 by flowing down the downcomer portion 59, the light water flows upward by being guided by the inner spherical surface of the lower plenum 58 in the upper direction, straightened by the straightener member 121, and flows into the core 53. At this time, the light water that flows upward by the inner spherical surface of the lower plenum 58 in the upper direction, collides with the straightener member 121, and is dispersed, thereby preventing the generation of large vortices. The generated vortices are eliminated by flowing in the upper direction around the columns 122 having larger diameters that function as a vortex elimination member. The flow rate of the light water supplied to the core 53 from the lower plenum 58 is uniformly straightened in the radial direction and the circumferential direction of the core 53.

In this manner, in the nuclear reactor according to the eighth embodiment, the lower plenum 58 in the reactor vessel 41 includes the straightener member 121 formed of the upper ring 65 and the lower ring in a ring shape and the columns 122 that function as a vortex elimination member.

Accordingly, when the light water introduced into the reactor vessel 41 through the inlet nozzles 44 flows down the downcomer portion 59, reaches the lower plenum 58, reversed in the lower plenum 58, and flows upward, the light water collides with the upper ring 65 and the lower ring, and disperses the flow, thereby preventing the generation of large vortices. The generated vortices are eliminated by flowing in the upper direction around the columns 122. Consequently, the flow rate of the light water supplied to the core 53 is uniformly straightened in the radial direction and the circumferential direction of the core 53. As a result, it is possible to enhance heat exchange efficiency.

[Ninth Embodiment]

Figure 13:
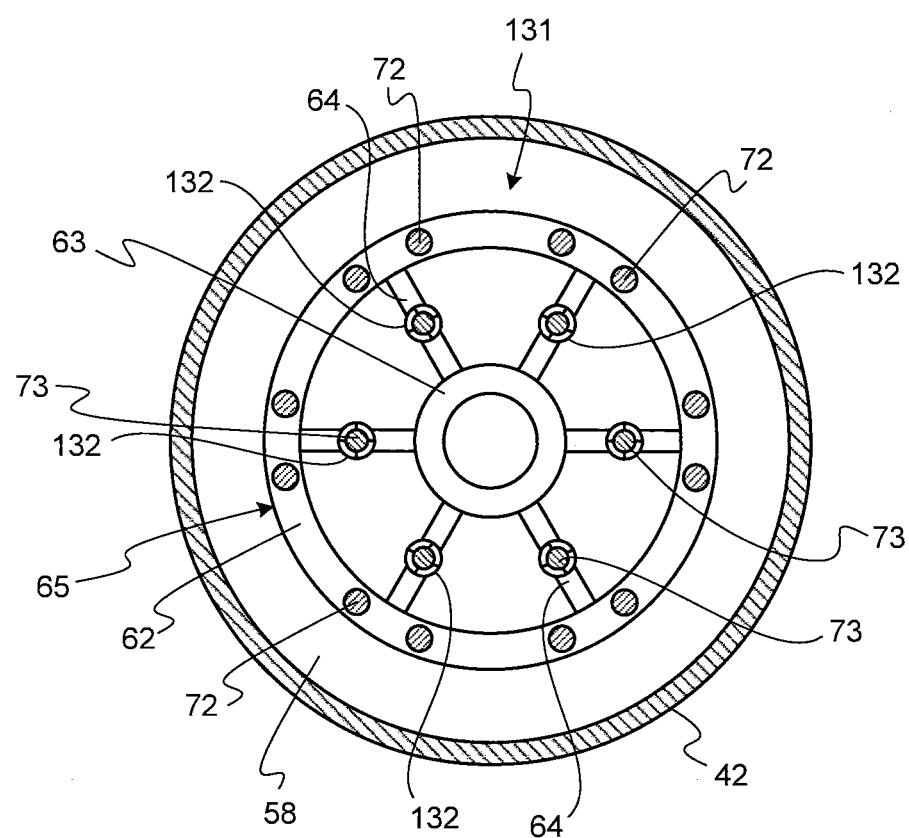
FIG. 13 is a horizontal sectional view of a straightener member provided in a pressurized water reactor according to a ninth embodiment of the present invention.
Figure 14:
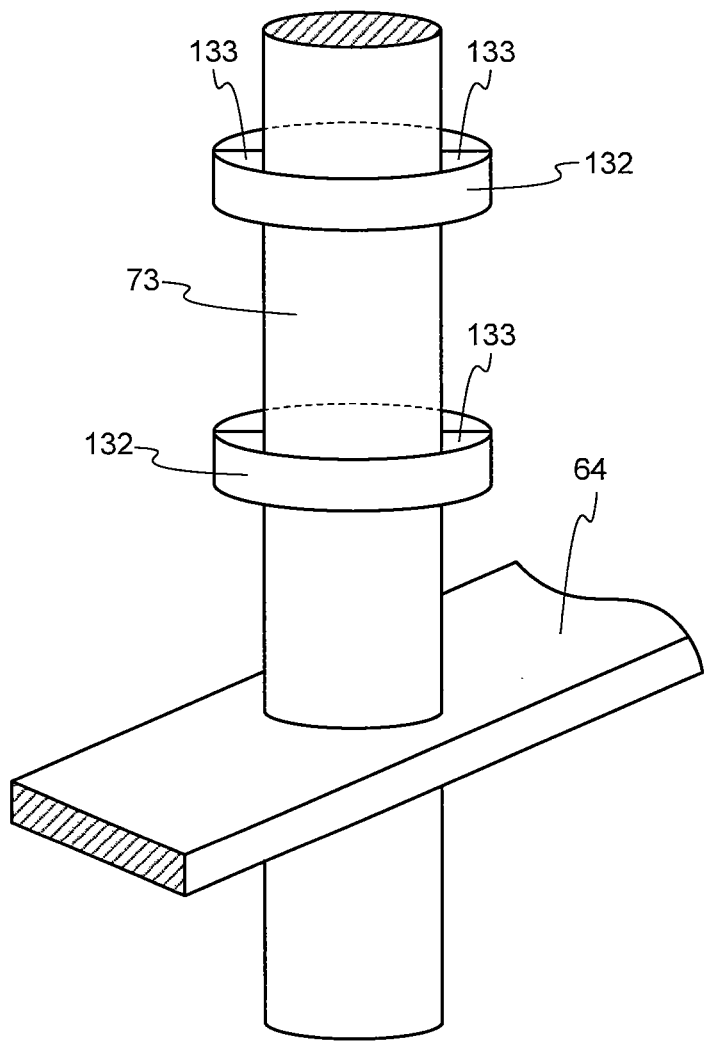
FIG. 14 is a perspective view of a vortex elimination ring provided in the straightener member of the ninth embodiment.

FIG. 13 is a horizontal sectional view of a straightener member provided in a pressurized water reactor according to a ninth embodiment of the present invention. FIG. 14 is a perspective view of a vortex elimination ring provided in the straightener member of the ninth embodiment. Because the overall configuration of a nuclear reactor according to the present embodiment is similar to that in the first embodiment, it will be described with reference to FIG. 1. The same reference numerals are denoted to portions having the same functions as those of the embodiment, and detailed descriptions thereof will be omitted.

In the nuclear reactor according to the ninth embodiment, as shown in FIGS. 1, 13, and 14, the lower plenum 58 includes a straightener member 131 that uniformly disperses and straightens the light water supplied to the lower plenum 58 from the downcomer portion 59 and flows upward to the core 53, in the circumferential direction and the radial direction of the core 53.

The straightener member 131 includes the upper ring 65 in which the upper outer ring 62 and the upper inner ring 63 are connected by the six upper spokes 64, and the lower ring similar to that in the first embodiment, which is not shown. The lower portions of the 12 pieces of columns 72 suspended from the lower core support plate 51 are connected to the upper outer ring 62 and the lower outer ring, and the lower portions of the six pieces of columns 73 are connected to the upper spokes 64 and the lower spokes. In this case, the upper ends of the six pieces of columns 73 connected to the upper spokes 64 and the lower spokes are fixed to the lower core support plate 51, and the lower ends of the columns 73 penetrate through the upper outer ring 62 and the lower outer ring, and extended around the bottom surface of the reactor vessel main body 42. A vortex elimination ring (vortex elimination member) 132 in a ring shape is provided at the outer peripheral portion of the columns 73, and fixed by a plurality of support bars 133. The vortex elimination ring 132 is provided in plurality in the axial direction of the columns 73 at regular intervals.

Accordingly, upon reaching the lower plenum 58 by flowing down the downcomer portion 59, the light water flows upward by being guided by the inner spherical surface of the lower plenum 58 in the upper direction, straightened by the straightener member 131, and flows into the core 53. At this time, the light water that flows upward by the inner spherical surface of the lower plenum 58, collides with the straightener member 131, and is dispersed, thereby preventing the generation of large vortices. The generated vortices are eliminated by flowing in the upper direction around the columns 73 and colliding with the vortex elimination ring 132. The flow rate of the light water supplied to the core 53 from the lower plenum 58 is uniformly straightened in the radial direction and the circumferential direction of the core 53.

In this manner, in the nuclear reactor according to the ninth embodiment, the lower plenum 58 in the reactor vessel 41 includes the straightener member 131 having the upper ring 65 and the lower ring in a ring shape and the vortex elimination ring 132 in a ring shape supported by the columns 72 and 73 suspended from the lower core support plate 51 and provided at the outer peripheral portion of the columns 73.

Accordingly, when the light water introduced into the reactor vessel 41 through the inlet nozzles 44 flows down the downcomer portion 59, reaches the lower plenum 58, reversed in the lower plenum 58, and flows upward, the light water collides with the upper ring 65 and the lower ring, and disperses the flow, thereby preventing the generation of large vortices. The generated vortices are eliminated by flowing in the upper direction around the columns 73 and colliding with the vortex elimination ring 132. Consequently, the flow rate of the light water supplied to the core 53 is uniformly straightened in the radial direction and the circumferential direction of the core 53. As a result, it is possible to enhance heat exchange efficiency.

In the eighth and the ninth embodiments described above, the columns 122 that function as a vortex elimination member are provided on the upper spokes 64, and the vortex elimination ring 132 is provided at the outer peripheral portion of the columns 73. However, thick columns that function as a vortex elimination member may be provided on the upper outer ring 62, or a vortex elimination ring may be provided at the outer peripheral portion of the columns 72.

[Tenth Embodiment]

Figure 15:
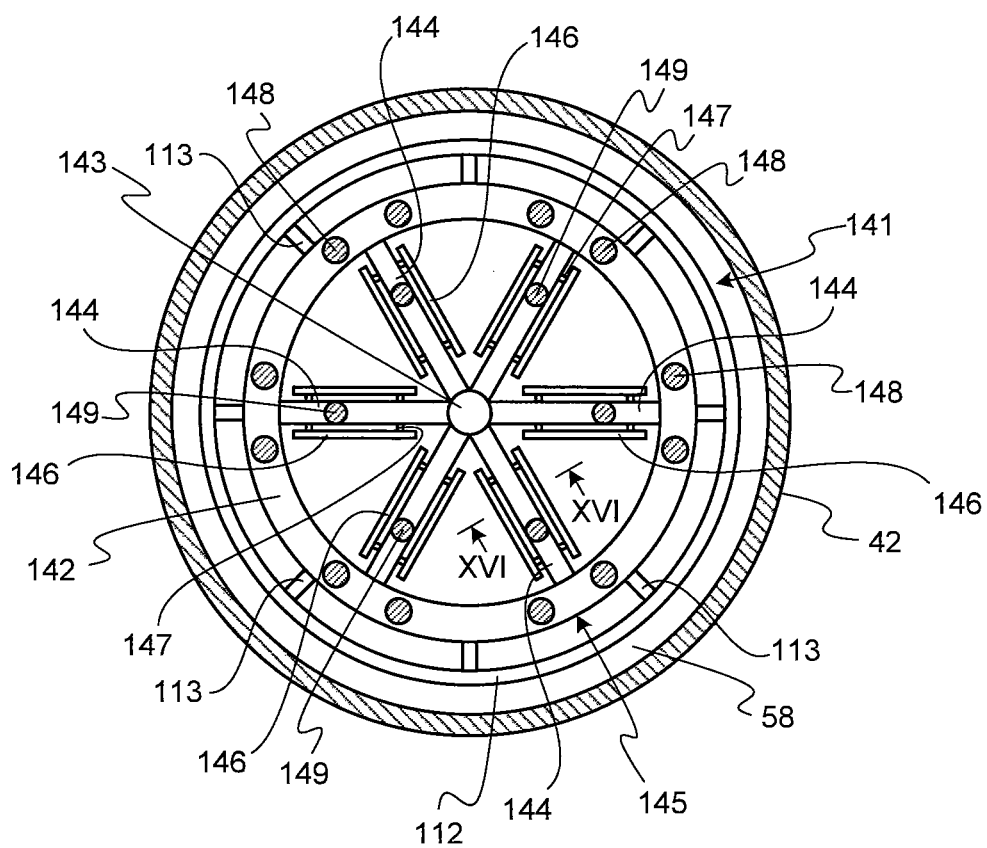
FIG. 15 is a horizontal sectional view of a straightener member provided in a pressurized water reactor according to a tenth embodiment of the present invention.
Figure 16:
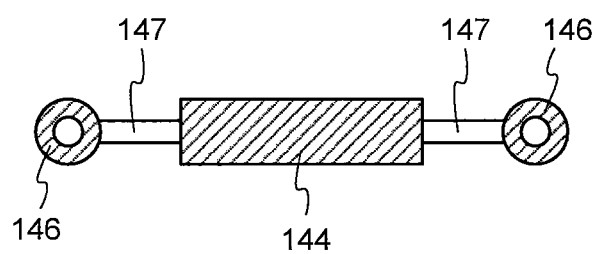
FIG. 16 is a sectional view taken along the line XVI-XVI in FIG. 15.

FIG. 15 is a horizontal sectional view of a straightener member provided in a pressurized water reactor according to a tenth embodiment of the present invention. FIG. 16 is a sectional view taken along the line XVI-XVI in FIG. 15. Because the overall configuration of a nuclear reactor according to the present embodiment is similar to that in the first embodiment, it will be described with reference to FIG. 1. The same reference numerals are denoted to portions having the same functions as those of the embodiment, and detailed descriptions thereof will be omitted.

In a nuclear reactor according to the tenth embodiment, as shown in FIGS. 1, 15, and 16, the lower plenum 58 includes a straightener member 141 that uniformly disperses and straightens the light water supplied to the lower plenum 58 from the downcomer portion 59, and flows upward to the core 53, in the circumferential direction and the radial direction of the core 53.

The straightener member 141 includes an upper ring 145 in which an upper outer ring 142 and a support shaft 143 are connected by six upper spokes 144, and the lower ring, similarly, in which the lower outer ring and the support shaft 143 are connected by six lower spokes, which is not shown. Vortex elimination pipes (vortex elimination member) 146 are provided at both sides of each of the upper spokes 144 in the lengthwise direction of the upper spoke 144, and is fixed by a plurality of connection bars 147. The lower portions of 12 pieces of columns 148 suspended from the lower core support plate 51 are connected to the upper outer ring 142 and the lower outer ring, and the lower portions of six pieces of columns 149 are connected to the upper spokes 144 and the lower spokes.

The auxiliary ring 112 is provided towards the inner surface of the nuclear reactor main body 42 from the outer peripheral portion of the upper outer ring 142. The auxiliary ring 112 is in a ring shape having a diameter larger than that of the upper outer ring 142, and has a cylindrical or a round cross-section. The auxiliary ring 112 is supported by the outer peripheral surface of the upper outer ring 142 with the eight connection bars 113.

Accordingly, when the light water flowing into the nuclear reactor main body 42 through the inlet nozzles 44 flows down the downcomer portion 59 to the lower plenum 58, the light water flows upward by being guided by the inner spherical surface of the lower plenum 58 in the upper direction, straightened by the straightener member 141, and flows into the core 53. At this time, the light water that flows down the downcomer portion 59, collides with the auxiliary ring 112, is dispersed, and reaches the lower plenum 58. The light water that flows upward by the inner spherical surface of the lower plenum 58 further collides with the straightener member 141, and is dispersed, thereby preventing the generation of large vortices. The generated vortices are eliminated by colliding with the vortex elimination pipes 146. Accordingly, the flow rate of the light water supplied to the core 53 from the lower plenum 58 is uniformly straightened in the radial direction and the circumferential direction of the core 53.

In this manner, in the nuclear reactor according to the tenth embodiment, the lower plenum 58 in the reactor vessel 41 includes the straightener member 141 having the upper ring 145 and the lower ring in a ring shape, and in which the vortex elimination pipes 146 are fixed to both sides of each of the upper spokes 144.

Accordingly, when the light water introduced into the reactor vessel 41 through the inlet nozzles 44 flows down the downcomer portion 59, reaches the lower plenum 58, reversed in the lower plenum 58, and flows upward, the light water collides with the upper ring 65 and the lower ring, and disperses the flow, thereby preventing the generation of large vortices. The generated vortices are eliminated by colliding with the vortex elimination pipes 146. Consequently, the flow rate of the light water supplied to the core 53 is uniformly straightened in the radial direction and the circumferential direction of the core 53. As a result, it is possible to enhance heat exchange efficiency.

In the embodiments described above, the straightener member is formed by arranging two rings in the vertical direction. However, one ring or equal to or more than three rings may be formed. In the embodiments, the straightener member is formed by arranging one or two rings in the radial direction. However, equal to or more than three rings may be formed. The cross-section of the ring is rectangular, but it may also be circular or ellipse. The six straightening spokes are provided in the circumferential direction. However, equal to or less than five spokes may be provided, or equal to or more than seven spokes may be provided. The straightening spokes are provided in the circumferential direction at regular intervals. However, corresponding to the inner surface shape of the reactor vessel main body 42, the straightening spokes may be disposed at irregular intervals.

In other words, the numbers of the straightening rings, the straightening spokes, and the columns may be appropriately set corresponding to the state of the vortex generated in the lower plenum 58. Depending on the state, the heights and the widths of the straightening rings, the straightening spokes, and the columns may be changed, and the resultant flow area of the light water flowing to the core 53, and the opening ratio may be set.

In the embodiments described above, the straightening ring is supported by the columns suspended from the lower core support plate. However, if the lower core support plate and the lower core plate are commonly used, the straightening ring may be supported by the columns suspended from the lower core plate. In other words, the lower core plate according to the present invention includes the lower core support plate and the lower core plate.

INDUSTRIAL APPLICABILITY

The nuclear reactor according to the present invention uniformly supplies the coolant towards the core from the lower plenum in the radial direction and the circumferential direction, by providing the straightener member in the lower plenum, and can be applied to any type of nuclear reactors.

The invention claimed is:

1. A nuclear reactor comprising:
   a pressure vessel that includes a coolant inlet nozzle and a coolant outlet nozzle at an upper portion thereof;
   a core barrel being disposed in the pressure vessel;
   a core being disposed in the core barrel;
   a lower plenum being partitioned by the pressure vessel and a bottom portion of the core barrel; and
   a downcomer portion being partitioned by the pressure vessel and a side wall of the core barrel, and being connected to the coolant inlet nozzle and the lower plenum;
   a lower core support plate provided at the lower portion of the core barrel;
   a plurality of columns suspended from the lower core support plate; and
   a straightener member including an upper straightening ring and a lower straightening ring, the upper straightening ring and the lower straightening ring being connected by the columns to be disposed in the lower plenum, to form two vortex suppressing rings, wherein the lower straightening ring includes a lower outer ring, a lower inner ring, and a plurality of lower spokes disposed radially between the lower outer ring and the lower inner ring,
   the upper straightening ring includes an upper outer ring, an upper inner ring, and a plurality of upper spokes disposed radially between the upper outer ring and the upper inner ring, and
   the plurality of columns suspended from the lower core support plate are connected to the upper outer ring and the lower outer ring, and are arranged in the circumferential direction of the upper outer ring and the lower outer ring.

2. The nuclear reactor according to claim 1, wherein an intermediate ring intersecting with the straightening spokes is provided between the outer ring and the inner ring.

3. The nuclear reactor according to claim 1, wherein an outer diameter of the upper ring is set larger than an outer diameter of the lower ring.

4. The nuclear reactor according to claim 1, wherein the straightening spokes arranged in the upper ring and the straightening spokes arranged in the lower ring are disposed to be shifted in a circumferential direction.

5. The nuclear reactor according to claim 1, further comprising a straightening auxiliary member arranged towards the inner surface of the pressure vessel from an outer peripheral portion of the upper outer ring.

6. The nuclear reactor according to claim 5, wherein the straightening auxiliary member is in a ring shape and supported by the outer peripheral portion of the upper outer ring with a plurality of connection members.

7. The nuclear reactor according to claim 5, wherein an upper surface of the upper outer ring is placed higher than an upper surface of the straightening auxiliary member.

8. The nuclear reactor according to claim 5, further comprising a wall member on an upper surface of the outer peripheral portion of the upper outer ring.

9. The nuclear reactor according to claim 1, further comprising:
   a plurality of additional columns suspended from the lower core plate, the additional columns being connected to the upper and lower spokes; and
   a vortex elimination member having a ring shape provided on an outer peripheral portion of the additional columns.

10. The nuclear reactor according to claim 1, further comprising a vortex elimination member provided on both sides of the upper straightening spokes in a lengthwise direction of the upper straightening spokes.

11. The nuclear reactor according to claim 1, further comprising:
   an upper core plate in an upper portion of the core barrel in the pressure vessel; and
   an instrumentation guide tube that penetrates the upper core plate from the upper portion of the pressure vessel.

12. The nuclear reactor according to claim 1, further comprising a vortex elimination member having a larger outer diameter than a width of the upper and lower spokes, in a vertical direction, the vortex elimination member being connected to the upper and lower spokes.

13. The nuclear reactor according to claim 1, wherein the upper straightening ring includes an upper outer ring, an upper inner ring, and a plurality of upper spokes disposed radially between the upper outer ring and the upper inner ring.

14. The nuclear reactor according to claim 1, wherein the pressure vessel includes further coolant inlet nozzles, and the plurality of lower spokes is arranged I the circumference direction of the lower straightening ring at regular intervals, such that one of the lower spokes is arranged between adjacent two of the inlet nozzles, and two of the lower spokes are arranged between separated two of the inlet nozzles.

15. The nuclear reactor according to claim 1, wherein the columns are arranged at the same position of the upper spokes and the lower spokes.

* * * * *